(12) United States Patent
Choksi et al.

(10) Patent No.: US 11,832,326 B2
(45) Date of Patent: Nov. 28, 2023

(54) SYSTEMS AND METHODS TO CONVERGE A MOBILE NETWORK OPERATOR (MNO) WITH A MULTIPLE-SYSTEM OPERATOR (MSO)

(71) Applicant: CABLE TELEVISION LABORATORIES, INC., Louisville, CO (US)

(72) Inventors: Ojas Thakor Choksi, Herndon, VA (US); Mariam Sorond, Reston, VA (US); Omkar Shripad Dharmadhikari, Lakewood, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 87 days.

(21) Appl. No.: 17/493,204

(22) Filed: Oct. 4, 2021

(65) Prior Publication Data

US 2022/0110177 A1 Apr. 7, 2022

Related U.S. Application Data

(60) Provisional application No. 63/236,496, filed on Aug. 24, 2021, provisional application No. 63/086,935, filed on Oct. 2, 2020.

(51) Int. Cl.
| | | |
|---|---|---|
| *H04W 36/08* | (2009.01) | |
| *H04W 76/16* | (2018.01) | |
| *H04W 8/20* | (2009.01) | |
| *H04W 12/06* | (2021.01) | |
| *H04W 88/06* | (2009.01) | |

(52) U.S. Cl.
CPC ............ *H04W 76/16* (2018.02); *H04W 8/20* (2013.01); *H04W 12/06* (2013.01); *H04W 88/06* (2013.01)

(58) Field of Classification Search
None
See application file for complete search history.

(56) References Cited

U.S. PATENT DOCUMENTS

2021/0204183 A1* 7/2021 Khalid .............. H04W 36/0033

* cited by examiner

*Primary Examiner* — Gary Lafontant
(74) *Attorney, Agent, or Firm* — Polsinelli PC

(57) ABSTRACT

Systems and methods manage data traffic by converging a mobile network operator (MNO) core network with a multiple-system operator (MSO) core network (e.g., a Hybrid-Mobile Virtual Network Operator (H-MVNO) core network). The system architecture includes one or more standards-based inter-network interfaces (e.g., as defined by Third Generation Partnership Project (3GPP) standards) established between the MSO core network and the MNO core network and/or a dedicated core to provide a data signal pathway between the MNO core network and the MSO core network. As such, a user equipment (UE) receives data services through the H-MVNO core network via the standards-based inter-network interface when the UE is connected to a radio access network (RAN) for the MNO core network. Various configurations provide data services for single-subscriber identity module (SIM) UEs and dual-SIM UEs. Voice/message services are provided by a voice/message core.

20 Claims, 11 Drawing Sheets

SYSTEMS AND METHODS TO CONVERGE A MOBILE NETWORK OPERATOR (MNO) WITH A MULTIPLE-SYSTEM OPERATOR (MSO)

CROSS-REFERENCE TO RELATED APPLICATIONS

The present application claims priority under 35 U.S.C. § 119 to U.S. Provisional Application No. 63/086,935, entitled "Full MVNO in a 5G Centric World" and filed on Oct. 2, 2020 and to U.S. Provisional Application No. 63/236,496, entitled "Full MVNO in a 5G Centric World" and filed on Aug. 24, 2021." Each of these applications is specifically incorporated by reference herein in its entirety.

FIELD

Aspects of the presently disclosed technology relate generally to managing traffic for Multiple-System Operators (MSO)s and, more particularly, to converging data traffic from multiple mobile networks into a single anchor within a MSO core network.

BACKGROUND

Multiple-system operators (MSO) that do not own the end-to-end mobile network generally provide wireless service using a mobile virtual network operator (MVNO) model, such that the MSO/MVNO leverages a portion of an MNO network via a business agreement. Typically, MVNOs focus on the marketing, billing, and customer facing aspects of the wireless service and rely on the MNO network and services infrastructure to deliver the connectivity and services (e.g., voice service, message service, and/or data services). The arrangement between the MVNO and the MNO typically includes payments from the MVNO to the MNO based on usage of the MNO network by MVNO customers. As data usage continues to grow at a compound annual growth rate (CAGR) of more than 25%, profitability is often tied to offloading data services for MVNOs. Additionally, the continued success of the MVNO impacts the wholesale revenues enjoyed by the MNOs resulting from the MVNO customer data usage.

With the widespread deployment of mobile technologies, such as Third Generation Partnership Project (3GPP), fourth generation long term evolution (4G LTE and Evolved Packet Core (EPC)), fifth generation new radio (5G NR and 5G System (5GS)), and/or the like, as well the prolific use of mobile devices (e.g., smartphones), connectivity service offerings provided by MSOs operating as an MVNO increasingly emphasize wireless connectivity. While MSOs that lack mobile network infrastructure (e.g., cable and satellite providers) often rely on the MVNO model to supplement their connectivity offerings with wireless, the MSOs can also deploy their own mobile infrastructure and use MVNO arrangements to supplement the network coverage of their deployment.

MSOs deployments typically rely on Wi-Fi networks to offload data usage from the MNO network. Although shared spectrum (e.g., citizens broadband radio service (CBRS)) reduces barriers for new entrants and small operators to further offload data usage and improve data service, deployment of shared spectrum typically involves MSOs building their own cellular infrastructure to enable data offloading when using CBRS in high usage areas. Such a MSO operating as a MVNO with its own mobile deployment is referred to as Hybrid MVNO (H-MVNO). As MSOs deploy wireless infrastructure, the MSOs often contend with three disparate sets of wireless infrastructures—an MSO community Wi-Fi network, an MNO 4G and/or 5G network through an MVNO arrangement, and an MSO 4G and/or 5G network. As user equipment (UE) moves in and out of these three networks, ensuring a consistent user experience and enforcing uniform and personalized policies may be challenging. As such, improvements to these systems are needed for the deployment of new converged network architectures to successfully maximize data offloading.

It is with these observations in mind, among others, that various aspects of the present disclosure were conceived and developed.

SUMMARY

Implementations described and claimed herein address the foregoing with techniques to converge the MNO core network with the H-MVNO core network. A method to manage traffic for a mobile virtual network operator (MVNO) can comprise: receiving, at a mobile network operator (MNO) core network, a setup request from a user equipment (UE) via at least one of an MNO access network or a hybrid (H)-MVNO access network; determining, at the MNO core network and based on an identifier included in the setup request, the UE is associated with a multiple-system operator (MSO) providing an H-MVNO core network; establishing one or more inter-network interfaces between the MNO core network and the H-MVNO core network; receiving one or more data packets, from the UE, at the MNO core network; and sending, using the one or more inter-network interfaces, the one or more data packets to the H-MVNO core network in response to the UE being associated with the MSO.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1A:
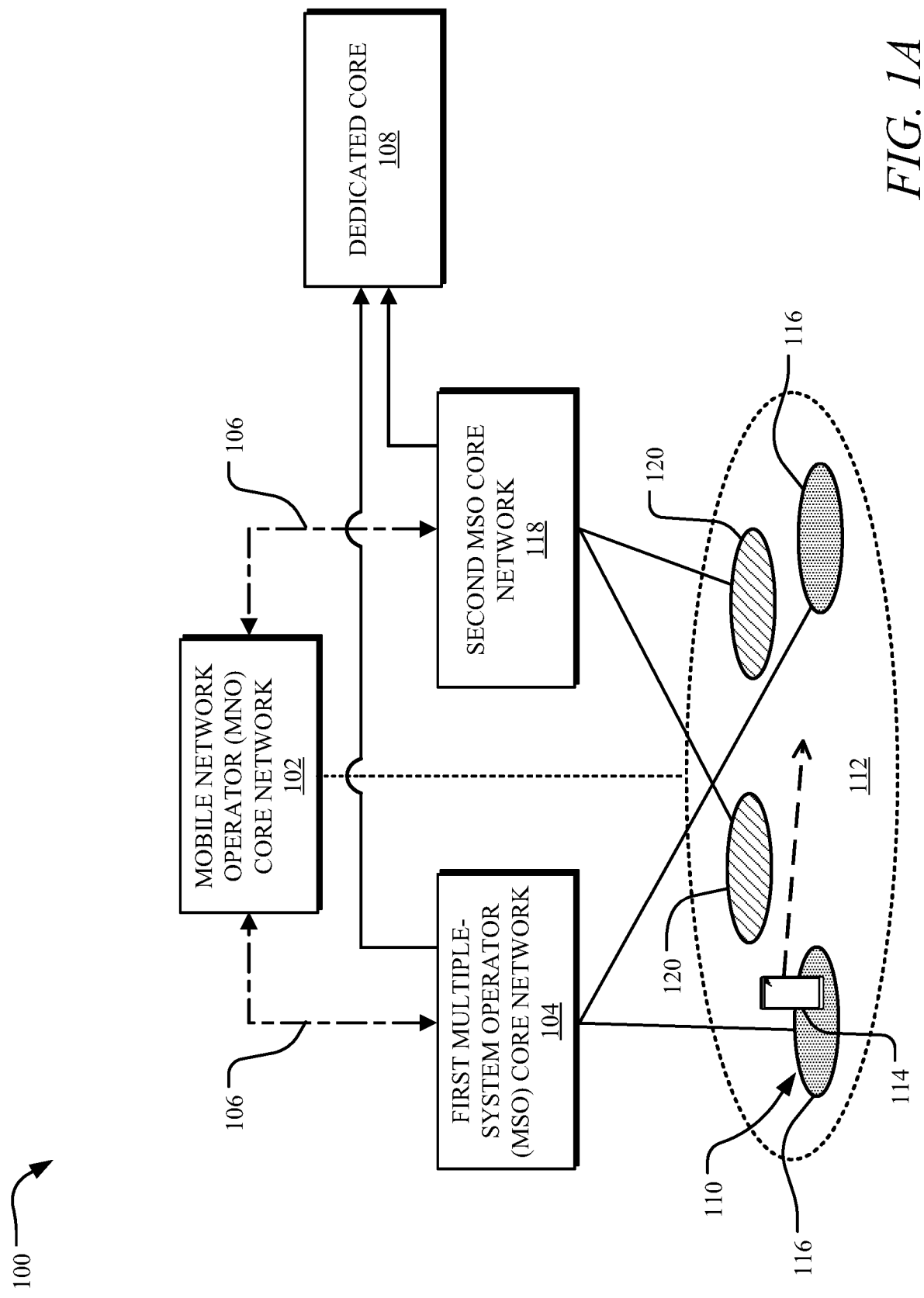
FIGS. 1A and 1B illustrate an example system to converge an MNO core network with one or more MSO core networks using an inter-network interface and/or a dedicated core.

The present disclosure involves systems and methods to manage traffic for MSOs operating as H-MVNOs by using one or more inter-network interfaces and/or a dedicated core. By using the techniques discussed herein, an H-MVNO, such as a cable operator, can enhance the user experience and reliability of its mobile service.

In some examples, the system includes an MNO 4G and/or 5G network (henceforth, MNO core network), with an MNO coverage area provided by an MNO access network to connect the UE to the MNO core network. The system also includes an MSO 4G and/or 5G network (henceforth, H-MVNO core network), with an H-MVNO coverage area provided by an H-MVNO access network. Various system architectures can establish one or more standards-based inter-network interfaces between the MNO core network and the H-MVNO core network. The standards-based inter-network interface(s) are used to route signaling and data packets received from the UE at the MNO core network (e.g., via the MNO access network) to the H-MVNO core network, for instance, when the UE is within the MNO coverage area but outside the H-MVNO coverage. The data signal pathway can be established and/or the data packets transmitted via an S8 interface, an S9 interface, an S6a interface, an N26 interface, S10 interface and/or the like (e.g., as defined by Third Generation Partnership Project (3GPP standards)). Additionally or alternatively, the MNO core network can establish a dedicated core (e.g., a dedicated MME, SGW, or PGW in case of 4G, and dedicated AMF, SMF and UPF in case of 5G) to provide the signaling and data pathway connecting the UE to the H-MVNO core network (e.g., via the MNO access network). The dedicated core is based on Multi Operator Core Network (MOON) specifications, dedicated core (DECOR) specifications, and/or enhanced dedicated core (eDECOR) specifications, as defined by the 3GPP standards.

The systems disclosed herein can support various device configurations, such as a dual-SIM UE (e.g., with an MNO SIM and an H-MVNO SIM) and a single-SIM UE (e.g., with only the H-MVNO SIM). For instance, with dual-SIM UEs, the data services can be provisioned to the H-MVNO SIM regardless of whether the dual-SIM UE is connected via the MNO access network or the H-MVNO access network, and voice/message services can be provisioned to the MNO SIM. In single-SIM UE scenarios, the systems provide voice and message (e.g., short message service (SMS)) services using a voice and message core provided by a third-party or can form part of the MNO core network. Moreover, the voice and message core uses various standards-based inter-network interfaces to provide a voice and message signaling and data pathway (e.g., an SGi/N6 interface, an Rx interface, and/or the like).

Multiple benefits result from the systems and methods discussed herein. The H-MVNO can maximize data offload capabilities onto their own mobile and Wi-Fi deployments while improving the user experience for customers of the H-MVNO (e.g., by applying uniform policies across irrespective of the access network used). The systems and methods also provide techniques for the MNO to differentiate itself from competitors by offering greater flexibility to the customers of the H-MVNO to access the MNO network resources. Moreover, by establishing the signaling pathway and the data pathway and rerouting the data packets using network functions (NFs) of the H-MVNO core network, the system can improve transparency of data usage for the H-/MVNO customer indicating which networks are used more precisely, which facilitates personalized service offerings.

Accordingly, MNOs and H-MVNOs alike can leverage the presently disclosed technology to converge policy and subscription infrastructure across multiple access networks (MNO, MSO/MVNO, Wi-Fi, etc.) and enable a seamless user experience to the end user irrespective of the underlying wireless access technology. Other advantages of the systems and methods disclosed herein will become apparent from the disclosure herein.

Figure 1B:
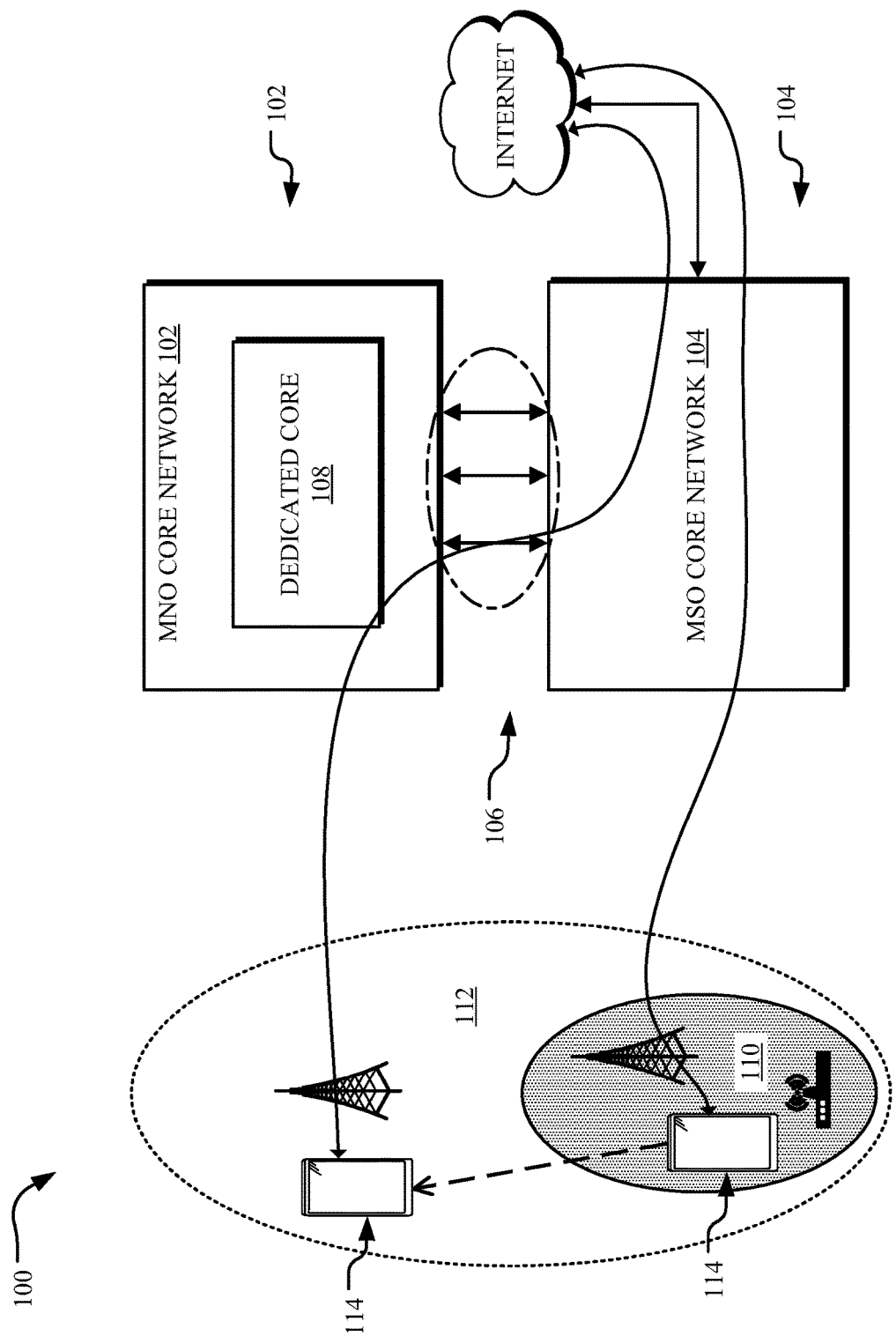

FIGS. 1A and 1B illustrate an example system 100 to converge an MNO core network 102 with an MSO core network 104 (e.g., which can be the H-MVNO core network 204 of FIGS. 2-8) using one or more standards-based inter-network interfaces 106, a dedicated core 108, and various other techniques. Accordingly, the system 100 provides techniques for H-MVNO deployment of localized access zones. The localized access zones can use Wi-Fi hotspots or small cell RAN nodes to create one or more H-MVNO coverage areas 110 within a larger MNO coverage area 112 provided by the MNO core network 102. The inter-network interfaces 106 and/or the dedicated core 108 can maximize HMVNO resources and provide seamless handovers for a UE 114 as it moves between the H-MVNO coverage areas 110 and the MNO coverage area 112.

In some examples, the system 100 can include a first core network such as the MSO core network 104 provided by a first MSO (e.g., a cable operator) operating an H-MVNO model to share access services with the MNO core network 102. For instance, the first MSO can deploy one or more Wi-Fi and 5G hotspots 116 (e.g., using a plurality of Wi-Fi routers and gNodeB cells) to create the H-MVNO coverage areas 110 within the MNO coverage area 112. A second core network such as a second MSO core network 118 provided by a second operator, such as a second MSO operating the H-MVNO model can also share services with the MNO core network 102, and also deploy localized access zones within the MNO coverage area 112. In some examples, the second core network can be provided by other types of providers, such as a satellite provider, a Digital Subscriber Line (DSL) provider, a fiber provider, and the like. The second MSO core network 118 can deploy one or more Wi-Fi and/or 5G hot spots 120 (e.g., using one or more Wi-Fi routers and gNodeB cells) to provide access to the second MSO core network 118. Any number of MSOs operating various MVNO models can create localized access zones within the MNO coverage area 112. The MNO core network 102 (e.g., and/or the MNO coverage area 112) can be associated with a first Public Land Mobility Number (PLMN) Identifier; the first MSO core network 104 can be associated with a second PLMN Identifier; and the second MSO core network 118 can be associated with a third PLMN Identifier.

The UE 114 can move between the various coverage areas while using services provided by the MNO core network 102, the first MSO core network 104, and the second MSO core network 118. When the UE 114 experiences a handover (e.g., using an S10 interface or a single-SIM configuration) from one of the H-MVNO coverage areas to the MNO coverage area 112 (e.g., by moving outside the range of the Wi-Fi hotspot 116), services provided by the MSO core network 104 can continue to be provided to the UE 114 with minimal disruption using the techniques discussed herein. For instance, the MNO core network 102 can use the established an S8 interface, an S9 interface, an S6A interface, and/or various other standards-based inter-network interfaces 106, to setup the session with the UE 114 and/or route packets between the UE 114 and the MSO core network 104 during the session. Moreover, the dedicated core 108 can provide a single core to service multiple, different MSO cores and facilitate handover between the MNO access network and the MSO access networks.

Many variations and embodiments are possible using the techniques disclosed herein. The UE 114 can have various device configurations including different network compatibilities and SIM capabilities (e.g., single-SIM, embedded (e)SIM, dual-SIM, etc.). Additionally, the MNO core network 102, the first MSO core network 104, and the second MSO core network 118 can include various types of cellular networks, public or private networks, Wide Area Networks (WAN)s, Local Area Networks (LAN)s (e.g., Bluetooth®, Wi-Fi, etc.) and combinations thereof. For instance, the MNO core network 102, the first MSO core network 104, and the second MSO core can be various combinations of a 3rd Generation Partnership Project (3GPP) network, (e.g., a third generation (3G) network, a fourth generation (4G) network, a fifth generation (5G) network, a sixth generation (6G) network, a Long-Term Evolution (LTE), and/or an LTE Advanced Network), a Global System for Mobile Communications (GSM) network, a Universal Mobile Telecommunications System (UMTS) network, and the like.

In some examples, the MSO core network 104 is operated by an MSO using the H-MVNO model. By using the H-MVNO ("hybrid"-MVNO), the MSO owns the mobile radio network deployed in specific geographic areas that may overlap with the MNO networks coverage area 112. These networks could be small cell hotspot deployments (e.g., the localized H-MVNO coverage areas 110) or traditional regional mobile deployments. Billing, customer network support, SIM credentials, handset functionality, subscriptions, and policies are managed by the MSO/H-MVNO. Additionally, the UE 114 can be prioritized to access and utilize the MSO/H-MVNO radio access network when available and to use the MNO radio access network only when it is outside the H-MVNO coverage areas 110. The H-MVNO model can be of particular interest to many MSOs who may have or are planning to have hotspot and/or regional mobile deployments. To deliver a seamless (e.g., converged) experience across the two wireless networks, a varying degree of convergence (e.g., interoperability) between the two networks may be established. The degree of convergence and interoperability between the networks can depend on the type of applications used by the end users, types of services to be provided by the H-MVNO network, and the desired level of visibility into the subscriber usage to enable customized service plans, as well as the amount of operational coordination acceptable to both the H-MVNO and the MNO. The H-MVNO model and associated converged system architectures are the focus of this disclosure, although the other MVNO models may make use of various aspects of the disclosed technology.

This disclosure is directed to the H-MVNO model and can also provide techniques for other MVNO models to transition into the H-MVNO model. For instance, the other MVNO models are a reseller MVNO, a light MVNO, a service provider MVNO, and a full MVNO. These classifications can be based on an amount of mobile network infrastructure owned by the MSO and a degree of control over management of different aspects of MSO subscriptions and MSO service offerings.

For instance, a reseller MVNO can manage the billing and customer network support functionality while using the MNO core network 102 for SIM management, device management, core network, and radio infrastructure. However, the reseller MVNO has no control over subscription, policy, and mobility management and lacks visibility into usage patterns of a subscriber to customize the service offering. The light MVNO model is similar to the reseller model, except the SIM and handset are managed by the MSO/MVNO while all other aspects remain unchanged. The MSO/MVNO still has limited to no control on network policies, subscription, and mobility management of the subscriber on the cellular network and lacks visibility into data usage by its customers. In comparison to the reseller and light MVNOs, a service provider MVNO is responsible for deploying, operating, and managing its own service platform, thereby enabling the MVNO to differentiate its service offering from that of the MNO. However, the radio access network and core infrastructures still belong to the MNO, and the service provider MVNO has limited control on network policies, subscription, and mobility management of the subscriber on the mobile network. With the full MVNO model, the MSO manages billing, customer network support, SIM credentials, handset functionality, subscriptions, and policies and has full visibility into data usage. However, the full MVNO has limited to no control over mobility management of the subscriber on the cellular network.

An MSO using these various MVNO model could benefit by using the techniques discussed herein to transition into the H-MVNO model.

Figure 2:
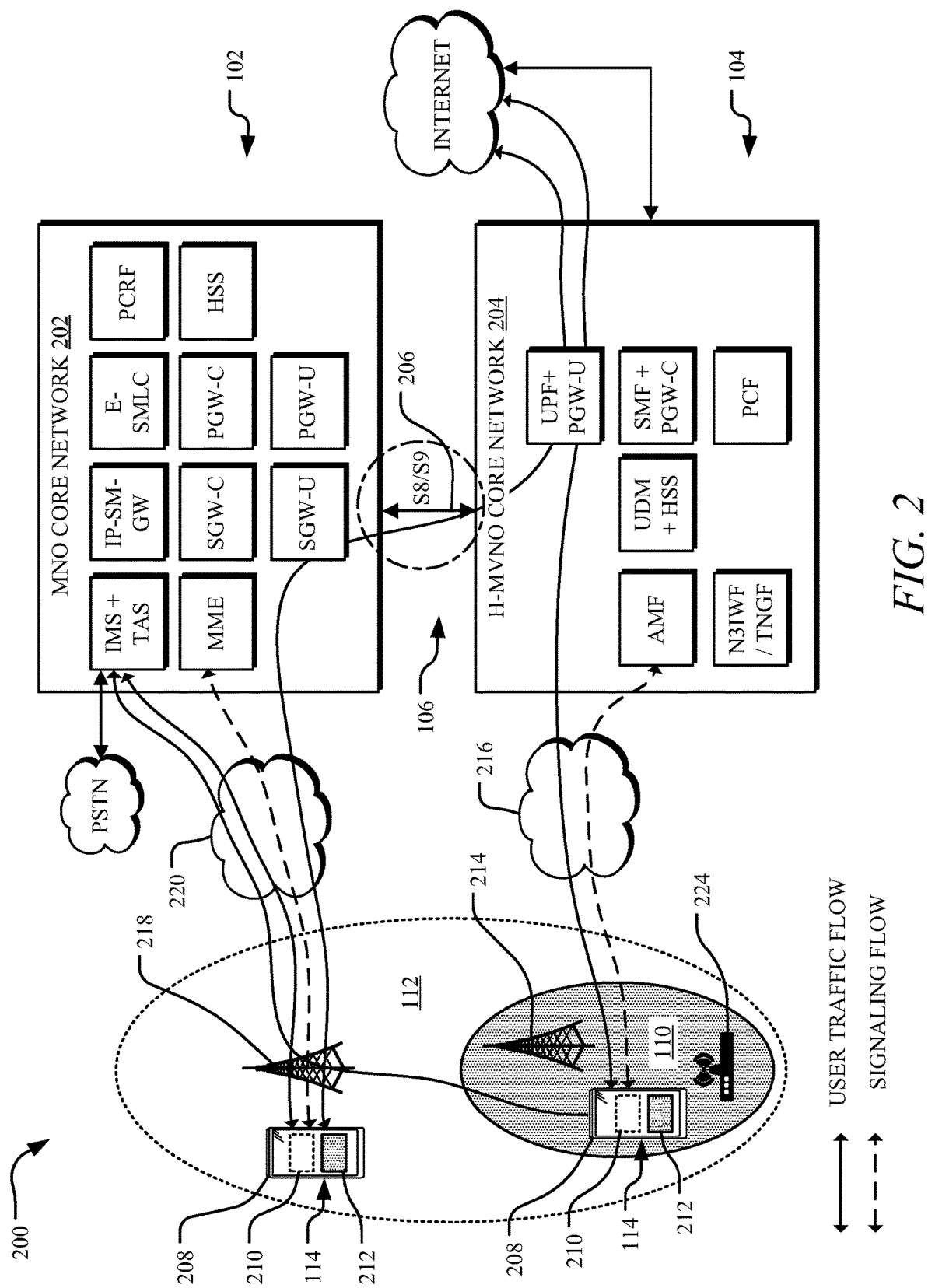
FIG. 2 illustrates an example system architecture to converge the MNO core network with an H-MVNO core network using an S8 interface and an S9 interface, which can form at least a portion of the system of FIG. 1.
Figure 3:
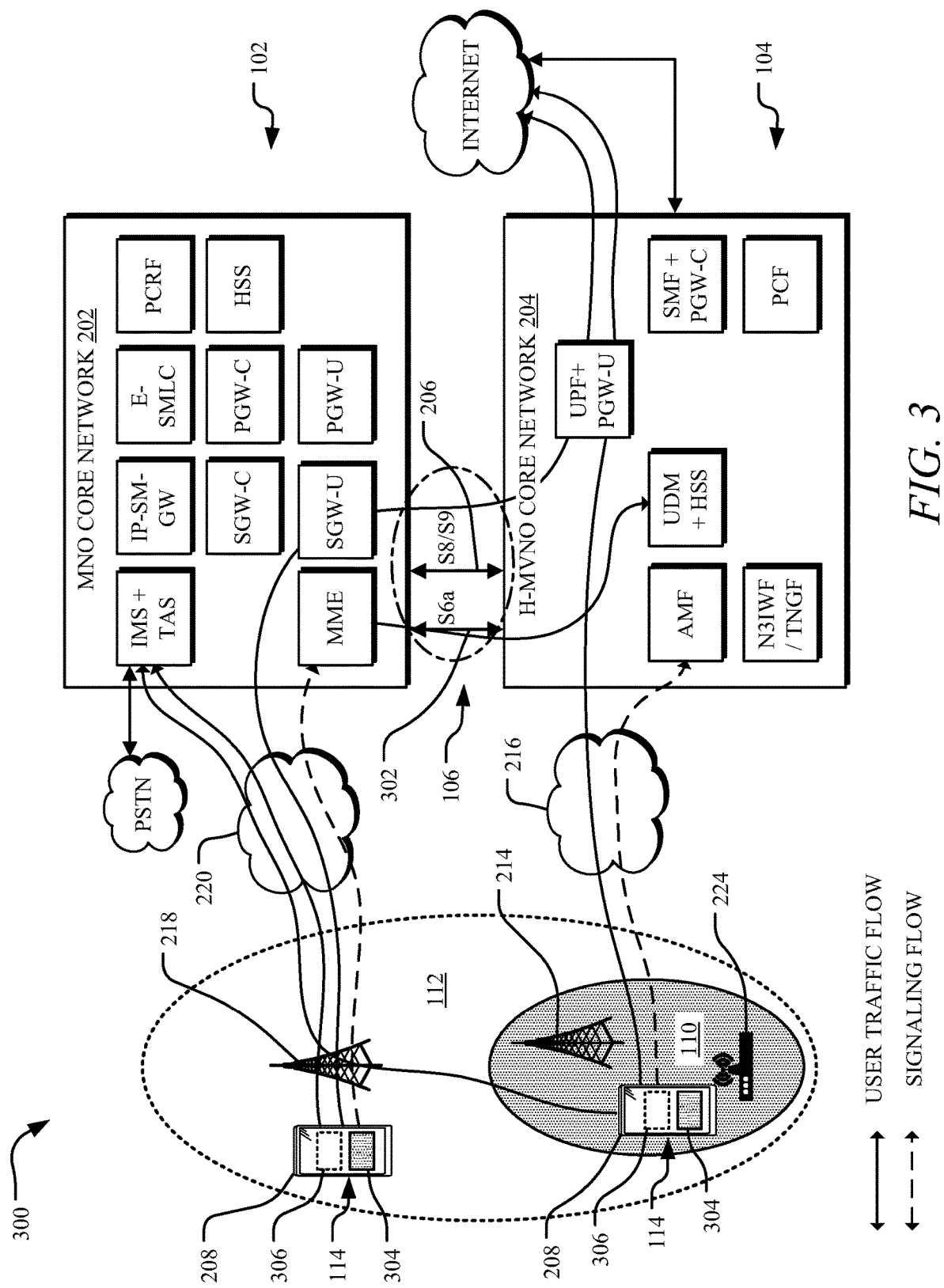
FIG. 3 illustrates an example system architecture to converge an MNO core network with an H-MVNO core network using an S8 interface, an S9 interface, and an S6a interface, which can form at least a portion of the system of FIG. 1.

FIGS. 2-8 illustrate various system architectures to converge the H-MVNO core network 104204 with the MNO core network 102, which can be performed by the system 100. Multiple system architectures are possible to address different device compatibilities (e.g., single-SIM versus dual-SIM) and different service types (e.g., voice services, message services, and data services). FIGS. 2 and 3 illustrate system architectures for dual-SIM devices and FIGS. 4-8 illustrate system architectures for both single-SIM and dual- SIM devices. FIGS. 2-5 primarily focus on routing packets between the MNO core network 102 and the H-MVNO core network 104 to provide data service for the MSO/H-MVNO and FIGS. 6-8 focus on additionally providing voice and message services for single-SIM devices. The techniques disclosed herein can be used to transition an MSO from a traditional reseller or light MVNO model to a H-MVNO model.

FIG. 2 illustrates an example system architecture 200 to converge an MNO core network 202 (e.g., the MNO core network 102) with an H-MVNO core network 204 (e.g., the MSO core network 104) using at least the S8 and/or S9 interface 206. The MNO core network 202 can form at least a portion of or be identical to the MNO core network 102, the H-MVNO core network can form at least a portion of the MSO core network 104, and the system architecture 200 can form at least a portion of and/or be implemented by the system 100.

In some examples, the UE 114 is a dual-SIM UE 208 with a first SIM 210 associated with the H-MVNO core network 204 and a second SIM 212 associated with the MNO core network 202. For instance, when the UE 114 is within the H-MVNO coverage area 110, the UE 114 may use the first SIM 210 to connect to an H-MVNO access network 214. The H-MVNO access network 214 can include one or more access nodes such as a Wi-Fi router, a Bluetooth router, a gNodeB, an eNodeB, a small cell, a femto cell, or other low-powered or short-range radio access nodes for connecting the UE 114 to an H-MVNO backhaul network 216 which, in turn, connects the UE 114 to the H-MVNO core network 204. The second SIM 212 can connect the UE 114 to an MNO access network 218. The MNO access network 218 can include one or more access nodes including a 3GPP access node such as a gNodeB, Node B, an eNodeB, or a Home eNodeB, or an access node for other types of networks (e.g., a Global System for Mobile Communications (GSM) base transceiver station (BTS)). The MNO access network 218 can connect the UE 114 to an MNO backhaul network 220 which, in turn, connects the UE 114 to the MNO core network 202.

In some instances, the MNO core network 202 can be a 3GPP network such as 4G network or a 5G network. For instance, the MNO network 202 can include various standard-defined network functions (NF)s of a 4G network including an Internet Protocol Multimedia Subsystem with a Telephony Application Server (IMS+TAS); an Internet Protocol Short Message Gateway (IP-SM-GW); an Enhanced Serving Mobile Location Center (E-SMLC); a Policy and Charging Rules Function (PCRF); a Mobility Management Entity (MME); a Serving Gateway Control Plane Function (SGW-C); a Packet Data Network Gateway Control Plane Function (PGW-C); a Home Subscriber Service (HSS); a Serving Gateway User Plane Function (SGW-U); a Packet Data Network Gateway User Plane Function (PGW-U), combinations thereof, and the like. The H-MVNO core network 204 can also be a 3GPP network, such as a 4G network or a 5G network. For instance, the H-MVNO network 204 can include the standard-defined NFs of a 5G network, such as a User Plane Function (UPF) with a PGW-U; an Access and Mobility Management function (AMF); a Unified Data Management (UDM) with an HSS; a Session management Function (SMF) with a PGW-C; a Non-3GPP Interworking Function (N3IWF) with a Trusted Non-3GPP Gateway Function (TNGF); a Policy Charging Function (PCF); combinations thereof; and the like. The system architecture 200 can also include a Public Switched Telephone Network (PSTN) in communication with the MNO network 202 (e.g., via the IMS+TAS). In some instances, components of the H-MVNO network (e.g., the H-MVNO access network 214) can operate on citizens' broadband radio service (CBRS) spectrum.

In some examples, subscriber traffic of the UE 114 for data services (e.g., data packets to and from the internet) is continuously anchored within and, therefore, provided via the H-MVNO core network 204 regardless of whether the UE 114 is connecting to the H-MVNO access network 214 with the first SIM 210 or the MNO access network 218 with the second SIM 212. For instance, the established S8/S9 interface(s) 206 can be used between the MSO core network 202 and the H-MVNO core network 204 to setup the route and the data traffic policies and route packets of data from the MNO core network 202 to the H-MVNO core network 204. In some instances, the S8 interface 206 include an S8-U interface between the SGW-U of the MNO core network 202 and the UPF+PGW-U of the H-MVNO core network 204; and an S8-C interface between the SGW-C of the MNO core network 202 and the SMF+PGW-C of the H-MVNO core network 204 (e.g., as defined in 3GPP). This anchoring of data traffic in the H-MVNO core network 204 can ensure full visibility for the MSO into subscriber internet data usage, irrespective of which access network is used by the UE 114. The first SIM 210 and the second SIM 212 can continue to be configured in their respective subscriber databases (e.g., the HSS for the MNO core network 202 and the UDM+HSS for the H-MVNO core network 204). The MME within the MNO core network 202 can select the H-MVNO packet gateway (e.g., SMF+PGW-C) based on a default access point name (APN) value included in a connection or setup request received from the UE 114 and authorized by the HSS. In some instances, the APN value can indicate to the MNO core network 202 that the UE 114 is a customer of the MSO/H-MVNO 104. For example, a Domain Name System (DNS) query sent from the MME can include both the tracking area code (TAC) and the APN to pick the nearest SMF+PGW-C to the UE 114. The SMF+PGW-C can then select a corresponding UPF+PGW-U network element nearest to the end user and/or the UE 114 (e.g., based on the estimated latency between the SGW-U and the UPF+PGW-U).

In the system architecture 200, the second SIM 212 (e.g., corresponding to the MNO network) can continue to be provisioned in the HSS of the MNO core network 202 so that voice and messaging services (e.g., including emergency calling/texting) can continue to be provided via the MNO core network 202 using the second SIM 212. While in the H-MVNO coverage area 110, the data services can be provided via the H-MVNO access network 214, unless the UE 114 is active on a voice call. While on the voice call, the data services can be provided via the MNO access network 218 using the second SIM 212. While outside the H-MVNO coverage area 110, the data services can be provided via the MNO access network 218 using the second SIM 212. However, the system architecture 200 can use a common data anchor point (UPF+PGW-U) located within the H-MVNO network, thereby providing full visibility into the data usage patterns and statistics.

In some examples, the one or more standards-based inter-network interfaces 106 (e.g., the S8/S9 interfaces 206) between the MNO and H-MVNO networks are established by the NFs of the MNO core network 202 and the H-MVNO core network 204. For instance, S-GW-C and SGW-U of the MNO core network 202 can be configured to establish the S8 interface 206 with a SMF+PGW-C and UPF+PGW-U of the H-MVNO core network 204; S9 interface is established between the PCRF of the MNO core network 202 and PCF+PCRF of the H-MVNO core network 204. Additionally, in the system architecture 200, the serving gateway of the MNO core network 202 (e.g., SGW-C) can generate charging records for subscribers of the H-MVNO core network 204.

While the S8 and S9 interfaces 206 are used to interconnect the two domains for user data, the user subscription associated with the second UE SIM 212 can continue to be provisioned in the HSS of the MNO core network 202, resulting in continued use of an intra-domain S6a interface for the control plane (e.g., discussed below regarding FIG. 3). The inter-domain interfaces between the MNO core network 202 and the H-MVNO core network 204 can be secured with a secured connection such as a security gateway. Because the H-MVNO core network 204 has control over the data traffic for the UE 114 irrespective of which access network the subscriber is on (the H-MVNO access network 214 or the MNO access network 218), the H-MVNO can implement uniform policies and functionalities in the H-MVNO core network 204 to manage steering/switching traffic, not only between two 3GPP access networks, but also between the MNO 3GPP access network and an H-MVNO non-3GPP access network (e.g., a H-MVNO a Wi-Fi access network 224 provided by Wi-Fi routers).

In the system architecture 200, it is possible to support access traffic steering, switching, and splitting (ATSSS) functionality across the H-MVNO's non-3GPP network (e.g., an untrusted or trusted Wi-Fi network such as the Wi-Fi access network 224) and the MNO 3GPP network (e.g., even when the MNO 3GPP network is 4G). For instance, while on the MNO core network 202 that is a 4G network, the ATSSS traffic rules on the UE 114 can be updated through the non-3GPP leg of the connection. This is based on additional functionality within the H-MVNO core network 204. For instance, the SMF+PGW-C of the H-MVNO core network 204 can retrieve information about the serving SMF+PGW-C and UPF+PGW-U and ensure that the same ATSSS anchor gateway is assigned for data traffic flowing across the two networks.

By enabling ATSSS functionality across the wireless assets of the H-MVNO core network 204 (e.g., the cellular components of the H-MVNO core network 204, the H-MVNO 3GPP access network 214 and/or Wi-Fi components of the H-MVNO Wi-Fi access network 224) and the MNO core network 202 and MNO 3GPP access network 218, a fully converged architecture can be realized, giving the MSO/H-MVNO significant flexibility in utilizing the available wireless access networks for user data transmission. Additionally, the capability to transfer the 3GPP leg of an ATSSS-compliant Multi-Access Protocol Data Unit (MA-PDU) session from the H-MVNO access network 214 (e.g., 5G network) to the MNO access network 218 (e.g., 4G network) can also be contemplated as a custom capability within the H-MVNO core network 204 such that no enhancements may be required in the MNOs 4G network. Depending on the implementation of the device IP stack, device side enhancements may or may not be necessary.

Turning to FIG. 3, a system architecture 300 can use an S6a interface 302 and the S8/S9 interface(s) 206 to converge the MNO core network 202 with the H-MVNO core 204, such that standards based ATSSS is enabled between the MNO core network 202 and the H-MVNO core network 204. The system architecture 300 can be implemented without using additional configurations within the MNO core network 202 or enabling ATSSS across both the first SIM 210 and the second SIM 212. The system architecture 300 depicted in FIG. 3 also facilitates use of Wi-Fi connectivity, when available, irrespective of whether the UE 114 is in the H-MVNO coverage area 110 or only the MNO coverage area 112. The system architecture 300 can form at least a portion of the system 100.

In some examples, the system architecture 300 depicted in FIG. 3 includes the features of the system architecture 200 and/or enhancements to the system architecture 200. In the system architecture 300, an H-MVNO SIM 304 is configured to roam onto the MNO access network 218 when outside the coverage of its home network, such as the H-MVNO access network 214. Therefore, in addition to the S8 and S9 interfaces 206, the system architecture 300 includes support of the inter-domain roaming S6a interface 302 between the MNO core network 202 and the H-MVNO core network 204 so the H-MVNO SIM 304 can provide data services to the UE 114 while in the MNO access network 218.

In some examples, data sessions are established by the system architecture 300 using the first SIM 210 (e.g., the H-MVNO SIM 304) irrespective of whether the UE 114 is inside or outside the H-MVNO coverage area 110. The second SIM 212 (e.g., an MNO SIM 306) can be used only for data sessions during an ongoing voice session. As in the system architecture 200 discussed above regarding FIG. 2, voice sessions can be established using the MNO SIM 306.

The S6a interface 302 can be used by the MNO core network 202 to authenticate access for the UE 114 via the H-MVNO SIM 304. In the event an MA-PDU session has been previously established, an anchor SMF+PGW-C is retrieved by the MME of the MNO core network 202 from the H-MVNO core network 204 via the S6a interface 302. Otherwise, the PGW selection can be done by the MME of the MNO core network 202 in the same way as described regarding the system architecture 200 of FIG. 2. The ATSSS MA-PDU may not be used when the UE 114 is accessing data services during an ongoing voice call and H-MVNO coverage 110 from Wi-Fi access network 214 may be unavailable.

In the system architecture 300, since data services are provided via the H-MVNO SIM 304 across both the MNO core network 202 and the H-MVNO core network 204, only the H-MVNO SIM 304 may have ATSSS configuration. Additionally, no customization for ATSSS across multiple SIMs may be needed in the MSO core 104 to utilize Wi-Fi connections, irrespective of whether the UE 114 is in the MNO coverage area 112 or the H-MVNO coverage area 110. Furthermore, since a single-SIM (e.g., the H-MVNO SIM 304) is used for data across the two networks, data session management can be simplified so that handover management is more efficient and effective as the device transitions in and out of H-MVNO coverage area 110. Like system architecture 200, system improved architecture 300 solves the issues of converged policies. Furthermore, custom intelligence built into the anchor point (e.g., PGW/SMF/UPF) can facilitate graceful transition from the H-MVNO access network 214 to the MNO access network 218 as soon as the UE 114 moves outside the H-MVNO coverage area 110 without customization on the device side.

The system architectures 200 and 300 depicted in FIGS. 2 and 3 provides various benefits, such as a near seamless handover service for the UE 114 using standardized roaming interfaces. Moreover, the system architectures 200 and 300 can support Dual Sim Dual Active (DSDA) and traffic splitting enhancements while minimizing the impact on the MNO access network 218 and the MNO core network 102.

Figure 4:
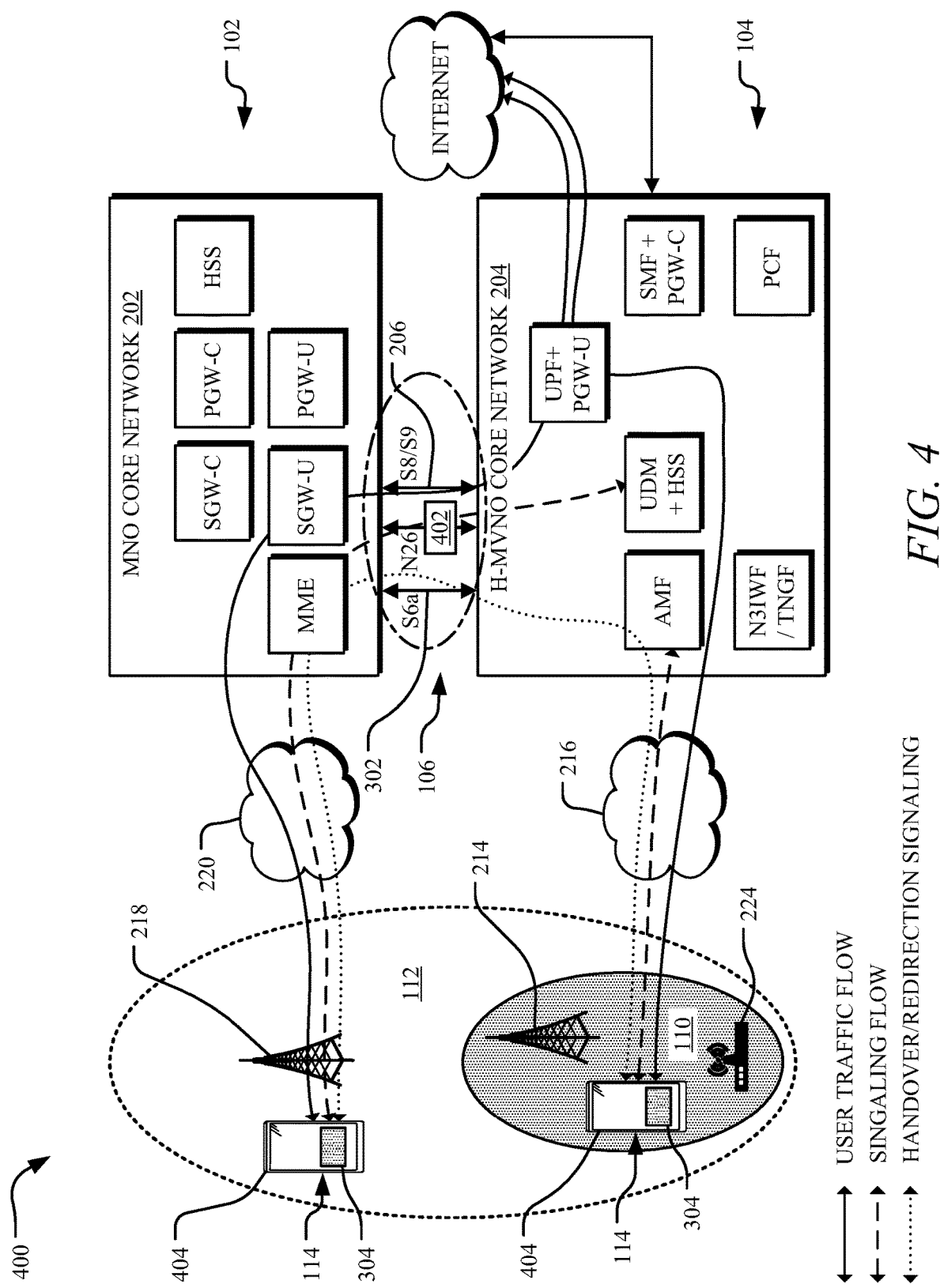
FIG. 4 illustrates an example system architecture to converge an MNO core network with an H-MVNO core network using at least an S8 interface, an S9 interface, an S6a interface, and an N26 network interface, which can form at least a portion of the system of FIG. 1.

FIG. 4 illustrates an example system architecture 400 to converge the MNO core network 202 with the H-MVNO core network 204 using the S6a interface 302, the S8/S9 interface(s) 206, and an N26 interface 402, which can form at least a portion of the system 100. The system architecture 400 can converge the two networks to provide low latency handovers to a single-SIM UE 404 for a seamless data service and, accordingly, can overcome issues related to dual-SIM scenarios. However, even though the system architecture 400 discussed herein is focused on single-SIM UEs 404, the techniques can be backwards compatible with the above DSDS/DSDA architecture to also support low latency handovers for dual-SIM UEs 208. The N26 interface 402, in some instances, enables low-latency data-centric applications (e.g., virtual reality/augmented reality applications). Moreover, in scenarios where the MNO core network 202 is a 4G network and the H-MVNO core network 204 is a 4G network, an S10 interface could be used instead of the N26 interface 402. If the MNO core network 202 is a 5G network and the H-MVNO core network 204 is a 5G network, N14 interfaces can be used instead of the depicted S10/N26; N9/N16/N24 interfaces instead of the depicted S8/S9 interface; and N8/N21 interfaces instead of the depicted S6a interface.

In some instances, seamless handovers between the H-MVNO access network 214 and the MNO access network 218 are provided for the single-SIM UE 404 by using the standards-based N26 interface 402. In the system architecture 400, the H-MVNO SIM 304 can be provisioned within the H-MVNO core network 204. Through the roaming interfaces (e.g., the S8 and S9 interfaces 206 and the S6a interface 302), the single-SIM UE 404 can obtain data service by connecting through either the MNO access network 218 or the H-MVNO access network 214. By using the N26 interface 402, the single-SIM UE 404 can seamlessly move between the H-MVNO access network 214 and the MNO access network 218 by executing inter-PLMN handover procedures. The H-MVNO access network 214 and the MNO access network 218 can control the mobility aspects of the single-SIM UE 404 (e.g., connected mode handovers and/or idle mode cell reselection) as it moves in and out of the H-MVNO coverage area 110, rather than relying on the single-SIM UE 404 to switch the data sessions between the two SIMs at the device level as in system architectures 200 and 300.

In some examples, the handover between the H-MVNO access network 214 and the MNO access network 218 can be enabled using appropriate mobility configuration and parameters (e.g., connected-mode and idle-mode configurations, event thresholds, etc.) for the single-SIM UE 404 with the H-MVNO SIM 304, taking into consideration the differences in the operating frequencies in the two access networks and the overlapping network coverage. Moreover, using the N26 interface 402 to enable the handover can impact the MNO NFs and therefore MNO users from the additional signaling traffic in the MNO core network 202 caused by potential ping-ponging between the two access networks as the single-SIM UE 404 with the H-MVNO SIM 304 transitions in and out of the H-MVNO coverage area 110.

As noted above, the system architectures 200-400 can include multiple H-MVNO partners, such as the first MSO core 104 provided by the first MNO and the second MSO core 118 provided by the second MNO. The MNO core network 202 will use the PLMN Identifier embedded in the International Mobile Subscriber Identifier (IMSI) to route to that subscriber's H-MVNO core network 204. Similar techniques to interoperate and secure the S8 and S9 interface(s) 206 and the S6a interface 302 can be used to secure the N26 interface 402 between the MNO core network 202 and the H-MVNO core networks 204. Differences in handover configurations due to differences in frequencies used by different H-MVNO access networks 214 and the MNO access network 218 can be resolved with access network specific mobility configurations within the access networks of the MNO 102 for access barring, handovers, and redirection using, for instance, a Radio Access Technology (RAT) Frequency Selection Priority ID (RFSP ID) (e.g., based on 3GPP standards).

Figure 5:
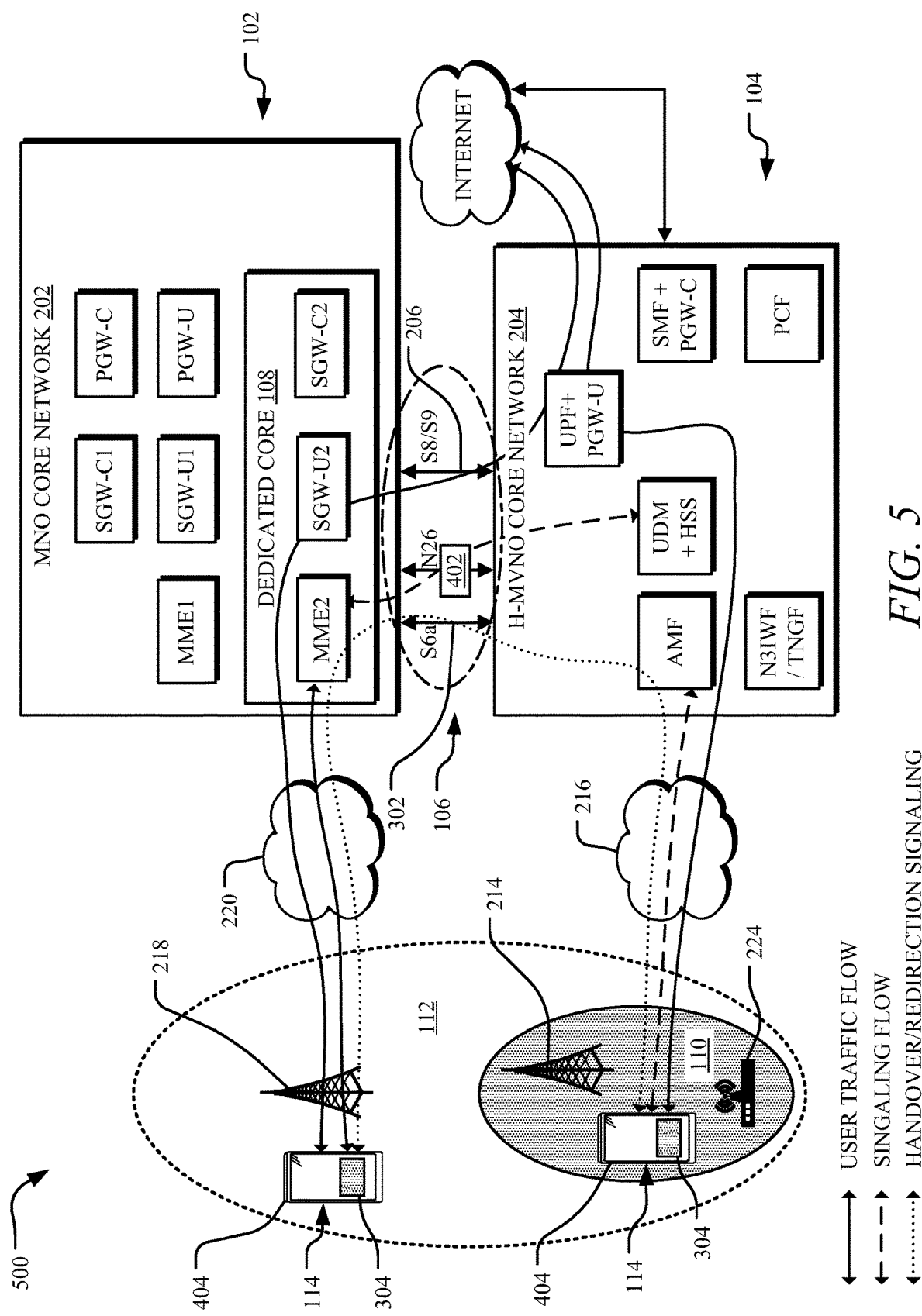
FIG. 5 illustrates an example system architecture to converge an MNO core network with an H-MVNO core network using a dedicated core and/or one or more inter-network interfaces, which can form at least a portion of the system of FIG. 1.

FIG. 5 illustrates an example system architecture 500 to converge the MNO core network 202 with the H-MVNO core network 204 using the dedicated core 108 and the one or more standards-based inter-network interfaces 106 (e.g., the S6a interface 302, the S8 and S9 interfaces 206, and the N26 interface 402), which can form at least a portion of the system 100. As noted above, the N26 interface 402, in some instances, enables low-latency voice and data-centric applications (e.g., virtual reality/augmented reality applications)

The system architecture 500 depicted in FIG. 5 can reduce the impact to MNO users from additional signaling traffic in the MNO core network 202 caused by potential ping-ponging between the two access networks. The amount of increase in excessive handovers and ping-ponging in the MNO core network can depend on the degree of contiguous deployment in the region by the H-MVNO (e.g., a number of handover boundaries between the two networks). Indoor/outdoor transitions could also result in many handover boundaries depending on the type of spectrum (low- or mid-band). The system architecture 500 addresses the issue of ping-ponging and corresponding signaling overload on the MNO core network 202 by using the dedicated core 108 for the H-MVNO traffic.

In some examples, the system architecture 500 using the dedicated core 108 can alleviate the impact of ping-pong handovers and associated risks of operating the MNO core network 102. Signaling and user traffic streams for the UE 114 can be processed within the dedicated core 108 rather than MNO core network 102, thereby isolating the signaling load generated from the mobility (e.g., movement between coverage areas) of the UE 114 (e.g., the single-SIM UE 404 with H-MVNO SIM 304) from that of the MNO's user devices. The dedicated core 108 can comprise a dedicated mobility management entity (MME) and/or a dedicated SGW (e.g., SGW-C+SGW-U).

In some instances, the dedicated core 108 can be deployed and managed within the MNO core network 202 or externally to the MNO core network 202, depending on the operational policies of the MNO providing the MNO core network 202. The dedicated core 108 can be shared across several H-MVNOs having an agreement with the MNO. The dedicated core 108 can separate the traffic of each H-MVNO by using the PLMN identifier values associated with the H-MVNO networks found in the subscriber IMSI, and routing the data to the appropriate H-MVNO networks. The MME hosted within the dedicated core 108 can perform a DNS query to select the SMF+PGW-Cs in individual H-MVNO networks, giving the H-MVNOs full control over the subscriber traffic associated with their networks. This designated MME can determine a H-MVNO of the user associated with the UE 114 (e.g., an MNO user or an MSO user) based on an identifier associated with the UE 114 (e.g.an international mobile subscriber identity (IMSI) value, an APN value, and the like) and route the data to the corresponding H-MVNO core network 204.

Depending on the capabilities of the UEs 114 and the MNO access network 218, the dedicated core 108 can be implemented using one or more standards-based functionalities, such as a Multi Operator Core Network (MOCN) or a standardized 3GPP Dedicated Core (DECOR).

In examples where the dedicated core 108 is MOCN based, the MNO access network 218 can broadcast two PLMN values—a first PLMN value associated with the MNO core network 202 and a second PLMN value associated with the dedicated core 108. The second PLMN value associated with the dedicated core 108 can be a different PLMN value than the PLMN value(s) used by the H-MVNO(s) for their home networks. The UE 114 (e.g., the single-SIM UE 404 with H-MVNO SIM 304) can be programmed either statically or dynamically to access the dedicated core 108 by using the second PLMN value when the UE 114 is outside the H-MVNO coverage area 110. The dedicated core 108 can use a home PLMN Identifier embedded in the IMSI to route the traffic to the different H-MVNO networks (e.g., the first MSO core 104, the second MSO core 118, etc.). Various advanced MOCN features (e.g., based on 3GPP standards), such as PLMN-specific configurations, parameters for access barring, handovers, and redirection, can be used by the MNO, creating distinct handover settings for MNO and H-MVNO user devices. This can enable handover parameter configurations to be customized, facilitating handovers between the MNO access network 218 and multiple H-MVNO access networks 214 and have a minimal if any impact on the handover operation and performance for other MNO user devices. By using the MOCN capabilities, the system architecture 500 can isolate MSO users to the dedicated core 108. Furthermore, the dedicated core 108 can de-risk operational impacts for the MNO core network 202 and can mitigate concerns about chattiness on the S10 interface (if both MNO core network 202 and H-MVNO core network 204 are 4G based), the N14 interface (if both MNO core network 202 and H-MVNO core network 204 are 5G based) or the N26 interface (if MNO core network 202 is 4G based and H-MVNO core network 204 is 5G based or vice versa) between the MNO core network 202 and the H-MVNO core network 204.

Additionally or alternatively, the dedicated core 108 can be based on the DECOR standard or an Enhanced Dedicated Core (eDECOR) standard. By implementing the dedicated core 108 as the DECOR in the MNO core 102 and MNO access network 218, traffic can be redirected to the dedicated core 108 based on information received in a subscription profile from the HSS of the H-MVNO core network 204. Additionally or alternatively, the UE 114 can be configured to be aware of the eDECOR. As such, the UE 114 can provide a dedicated core network ID (DCN-ID) value when the UE 114 accesses the MNO network (e.g., the MNO access network 218 and/or the MNO core network 202). The MNO network can use the DCN-ID value to route traffic from the UE 114 to the dedicated core 108. Like other configurations discussed herein, the MNO access network 218 and the MNO core network 202 can have the DECOR redirection/routing capabilities using 3GPP standardized features. In addition, to isolate the handover configurations for MNO-specific and H-MVNO-specific devices, additional configurations may be implemented in the MNO access network 218. In some instances, the system architecture 500 uses custom handover configurations by using a standardized index such as the RAT Frequency Selection Priority ID (RFSP ID). In system architecture 500, by using the DECOR as the dedicated core 108, the MNO may not be able to configure separate access barring configurations for the H-MVNO devices. The selection of the MOON, the DECOR, and/or the eDECOR as the dedicated core 108 can be based on the capabilities of the MNO access network 218, the MNO core 102, and/or the H-MVNO devices (e.g., the single-SIM UE 404 with the H-MVNO SIM 304) and operational considerations of the MNO.

In some instances, in addition to the dedicated core 108, the system architecture 500 can include a dedicated proxy function (pCU) to enable standards-based inter-network interfaces 106 to be an Xn interface between the Centralized Units (CU) of disaggregated 5G gNodeBs of the MNO access network 218 and the H-MVNO access network 214. The pCU may also interwork LTE X2 and 5G Xn interfaces if the MNO access network 218 comprises of disaggregated eNodeBs and the H-MVNO access network 216 comprises of disaggregate gNodeBs. In 5G/4G architectures, the disaggregated gNodeB/eNodeB can include a split Baseband Unit (BBU) comprising of a Distributed Unit (DU) and a Centralized Unit (CU). The dedicated pCU unit can enable dual connectivity for the UE 114 when in the H-MVNO coverage area 110 of the H-MVNO access network 214 and also within the MNO coverage area 112 of the MNO access network 218. As such, the UE 114 can send or receive traffic using resources of both the MNO core network 202 and the H-MVNO core network 204. The establishment of Xn interface can improve data throughput through simultaneous use of MSO and MNO RAN resources. An additional standards-based inter-network interfaces 106 can be established between the MME of the dedicated core 108 and the AMF of the H-MVNO core network 204 to further enable the dual connectivity of the centralized RAN unit in case the MNO access network 218 comprises of 4G disaggregated eNodeB.

Figure 6:
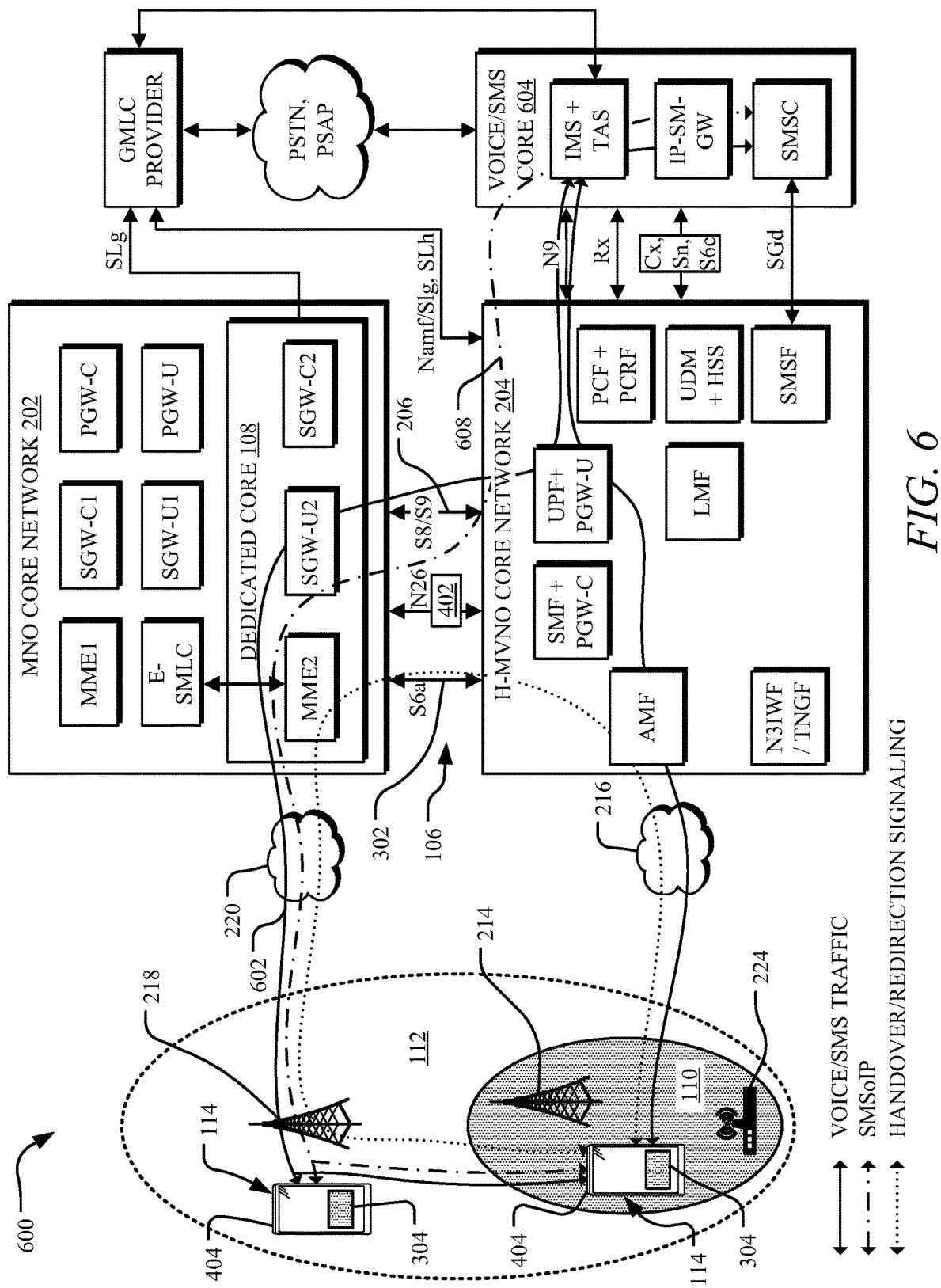
FIG. 6 illustrates an example system architecture to converge an MNO core network with an H-MVNO core network and provide voice and message services with a voice/message core, which can form at least a portion of the system of FIG. 1.

FIG. 6, illustrates an example system architecture 600 that can form at least a portion of the system 100 to facilitate voice and SMS services for single SIM UE 404. The system architecture 600 can be implemented as part of the system architecture 400 and/or the system architecture 500 depicted in FIGS. 4 and 5, for instance, using an LTE MNO core network 202.

In some examples, voice and SMS services use additional operations in the mobile core network (e.g., the dedicated core 108 and/or the H-MVNO core network 204) that are different than components to provide data services. This additional functionality may support one or more of voice and SMS applications, mobile number portability (MNP), interconnection/interwork functionality using PSTN, and/or emergency services (e.g., which may be based on local regulations).

Given the widespread deployment of voice over LTE (VoLTE), there may be several ways to leverage the VoLTE components as defined by 3GPP standards to enable voice service over 5G New Radio (NR). Voice services may be enabled using VoLTE 3GPP standards (e.g., and/or 5G deployments) that specify redirection from the 5G network to the 4G network for voice sessions to facilitate use of VoLTE. One way to perform this redirect is through handover at the time of the voice media setup procedure, and another way can be through radio channel redirection. The method of deployment can be determined by the MNO operators and can depend on the MNO network capabilities and configurations.

In some examples, the H-MVNO can support voice and messaging services via an MSO voice/messing platform or a third-party voice/messaging platform. FIG. 6 depicts voice and SMS data flows when the UE 114 is in both the H-MVNO coverage area 110 and the MNO coverage area 112, and when the UE 114 is only in MNO coverage area 112. In system architecture 600, the UE 114 can be the single-SIM UE 404 with the H-MVNO SIM 304.

In some instances voice traffic flow 602 depicts the traffic pathway after the UE 114 is redirected to the MNO core network 202 upon completion of voice call setup when the UE 114 is inside the H-MVNO coverage area 110 and/or when the UE 114 is camped/connected to the MNO access network 218 (e.g., when the UE 114 is outside the H-MVNO coverage area 110). The voice traffic flow 602 can be directed to various NFs of the MNO core network 202, the H-MVNO core network 204, and a voice/SMS core 604 (e.g., an IMS+TAS of the voice/SMS core 604) provided by a third-party or partner service, as depicted in FIG. 6. Signaling flow 606 depicts the path which can be established to effect voice handover/redirection using the MME of the dedicated core 108 and the AMF of the H-MVNO core network 204 when the voice call is initiated or received by the UE 114 when it is camped/connected on the H-MVNO access network 214. Traffic flow 608 depicts the path for SMSs for UE 114 when connected to the MNO core network 202 when the UE 114 is inside the H-MVNO coverage area 110 and/or camped/connected to the MNO access network 218 (e.g., when the UE 114 is outside the H-MVNO coverage area 110), for instance, using the SGW-U of the dedicated core 108. The SMS traffic flow 608, when camped/connected to the H-MVNO access network 214, can be via the UPF+PGW-U of the H-MVNO core network 204 to connect to the NFs of the voice/SMS core 604.

In the system architecture 600, the mobile connection for voice and SMS can be anchored at the UPF of the H-MVNO core network 204 when the UE 114 is located in either the H-MVNO access network 214 or the MNO access network 218.

Figure 7:
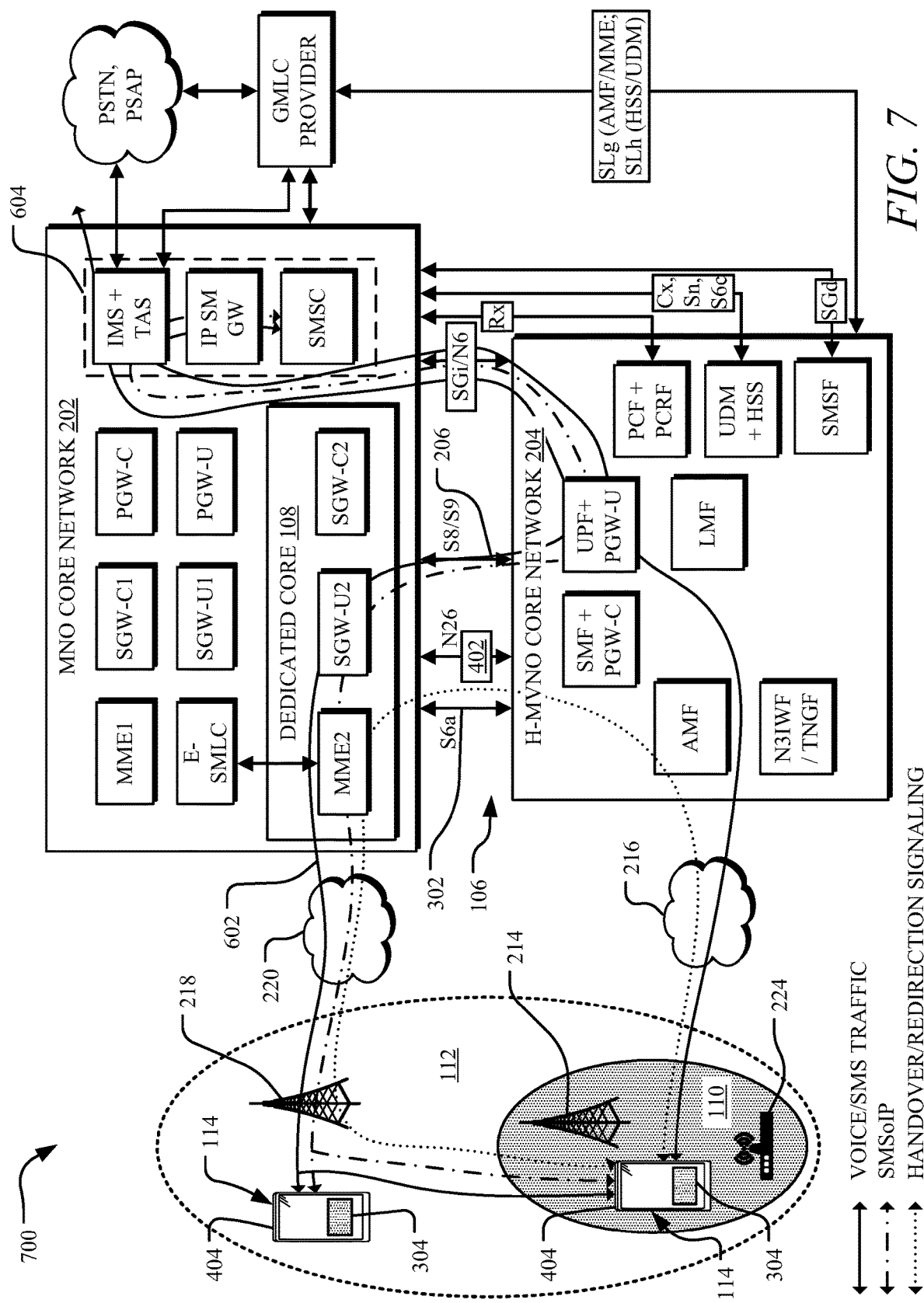
FIG. 7 illustrates an example system architecture to converge an MNO core network with an H-MVNO core network and provide voice and message services with the MNO network core, which can form at least a portion of the system of FIG. 1.

FIG. 7 illustrates another example system architecture 700 that can form at least a portion of the system 100 to facilitate voice and SMS services. The system architecture 700 can be implemented as part of the system architecture 400 and/or the system architecture 500 depicted in FIGS. 4 and 5, for instance, using an LTE MNO core network 202.

In some instance, the system architecture 700 uses voice/SMS service platforms of the MNO (e.g., the MNO core network 202) while the voice subscription and related credentials are configured in the H-MVNO core network 204 (e.g., at the UDM+HSS), effectively leveraging the voice/SMS platform of the MNO as the voice/SMS core 604. As described below, there are at least two ways to leverage infrastructure and/or NF components of the MNO network(s)—the system architecture 700 and the system architecture 800 depicted in FIG. 8.

In the system architecture 700, additional 3GPP interfaces between NFs of the MNO core network 202 (e.g., the IMS, the IP-SM-GW, and the SMSC) and NFs of the H-MVNO core network 204 (e.g., the UDM+HSS, the PCF+PCRF, and the SMSF) are configured. The MNO voice and SMS platforms can use these interfaces to authenticate/authorize the user associated with the UE 114 as well as store and retrieve the subscription and registration status/info (e.g., using the Mobile Country Code and Mobile Network Code (MCC+MNC) from the IMSI of the UE 114). This can ensure successful registration for voice and SMS services within the IMS and IP-SM-GW of the H-MVNO users in MNO core network 202. The system architecture 700 can also ensure proper forwarding of the incoming calls and text messages when the UE 114 is camped/connected to either the H-MVNO access network 214 or the MNO access network 218 by retrieving the status information from the H-MVNO core network 204. The voice and SMS data connection can remain anchored in the UPF of the H-MVNO core network 204. The voice traffic and SMSs can be transferred from a UPF of the H-MVNO core network 204 to the IMS voice and SMS platform of the MNO core network 202 through a secure data connection. The IMS of the MNO core network 202 can interface with the PCF+PCRF of the H-MVNO core network 204 (e.g., either directly or via a local MNO PCRF) using an Rx interface to set up dedicated bearers for the voice media traffic.

Figure 8:
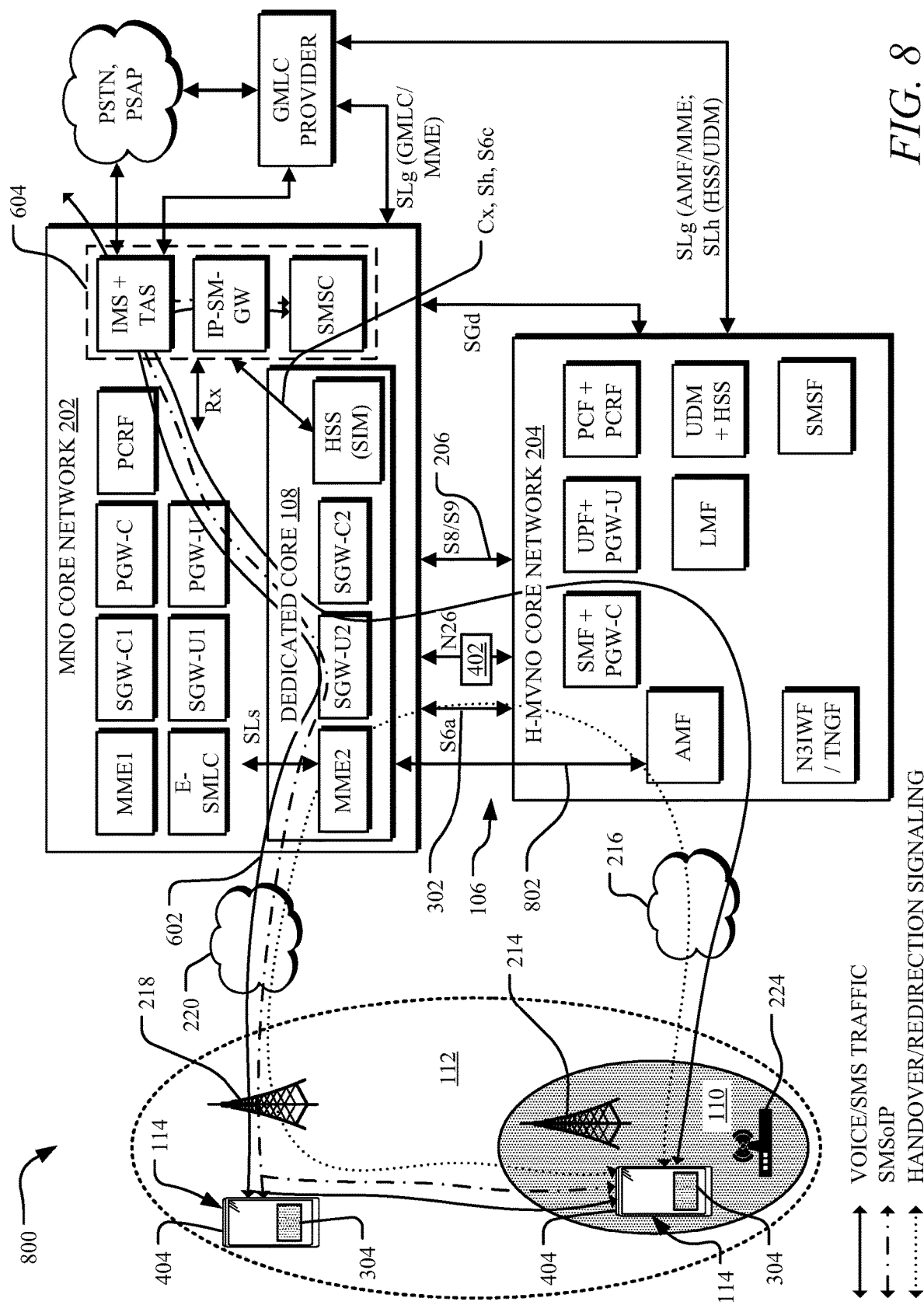
FIG. 8 illustrates an example system architecture to converge an MNO core network with an H-MVNO core network and provide voice and message services with the MNO network core, which can form at least a portion of the system of FIG. 1.

FIG. 8 illustrates an example system architecture 800 that can form at least a portion of the system 100 to facilitate voice and SMS services. The system architecture 800 can be implemented as part of the system architecture 400 and/or the system architecture 500 depicted in FIGS. 4 and 5, for instance, using an LTE MNO core network 202. The system architecture 800 depicted in FIG. 8 uses NFs of the MNO core network 202 to provide voice and message services, for instance, to a single-SIM UE 404 with the H-MVNO SIM 304.

In some examples, the MSO operating the H-MVNO core network 204 can use a separate integrated SIM (ISIM) instead of deriving an IMS Public User Identity (IMPU) value from the USIM. Moreover, in some instances, the ISIM is provisioned in a separate HSS located within the MNO core network 202 and/or the dedicated core 108.

In some instances, the system architecture 800 uses IMS functions of the MNO core network 202 to authenticate the requesting UE 114 locally without interacting with the HSS of the H-MVNO core network 204 but with the HSS of the dedicated core 108. Furthermore, in some instances, an IMS APN associated with the UE 114 can be anchored in the PGW of the MNO core network 202, eliminating interactions between the PCRF of the MNO core network 202 and the UPF of the H-MVNO core network 204 for the setup of the dedicated bearer.

The system architecture 800 can provide the voice traffic flow 602 using the SGW-U of the dedicated core 108 (e.g., in the MNO core network 202) and the IMS+TAS of the voice/SMS core 604 (e.g., also in the MNO core network 202); and the redirection signaling flow 606 established using the dedicated MME of the dedicated core 108 and the AMF of the H-MVNO core network 204 when the UE 114 is camped/connected on the H-MVNO access network 214. Moreover, the flow 608 in the system architecture 800 shows the SMS traffic path when connected to the MNO core network 202 when the UE 114 is inside the H-MVNO coverage area 110 and/or connected to the MNO access network 218 (e.g., when the UE 114 is outside the H MVNO coverage area 110), for instance, using the SGW-U of the dedicated core 108. The SMS traffic flow 608, when camped/connected to the H-MVNO access network 214, can be via the UPF+PGW-U of the H-MVNO core network 204 to connect to the NFs of the voice/SMS core 604 in the MNO core network 202.

In scenarios where the MNO deploys a 4G EPC core only, the dedicated core 108 can incorporate an interworking function 802 to translate hypertext transfer protocol (HTTP) interface based 5G session control signaling messages (e.g., received from the AMF of the H-MVNO core network 204) into general packet radio service (GPRS) Tunneling Protocol Control (GTP-C) based 4G EPC signaling messages. In some instances, the AMF of the H-MVNO core network 204 can be customized to support this function Accordingly, the MNO can successfully set up the PGW in the MNO core network 202 as the anchor. In some examples, rather than deploy this new interworking function, a dedicated UPF for voice could be deployed by the MNO as part of the dedicated MNO core 102.

In the system architecture 800, a Short Message Service Center (SMSC) can interact with the UDM+HSS of the H-MVNO core network 204 to determine one or more SMS serving node(s) (e.g., the SMSF or the IP-SM-GW), for instance, using an optional SGd interface. In addition, a Gateway Mobile Location Centre (GMLC) provider can still interact with the UDM+HSS of the H-MVNO core network 204 to query the serving node (e.g., the AMF and/or MME) to retrieve the location of the UE 114, for instance, during text to 911 sessions while the UE 114 is connected via the H-MVNO access network 214. In some instances, the MSO/H-MVNO serving node in turn can direct a Location Management Function (LMF) in the MSO core 104 to determine user location of the UE 114 during text to 911.

Figure 9:
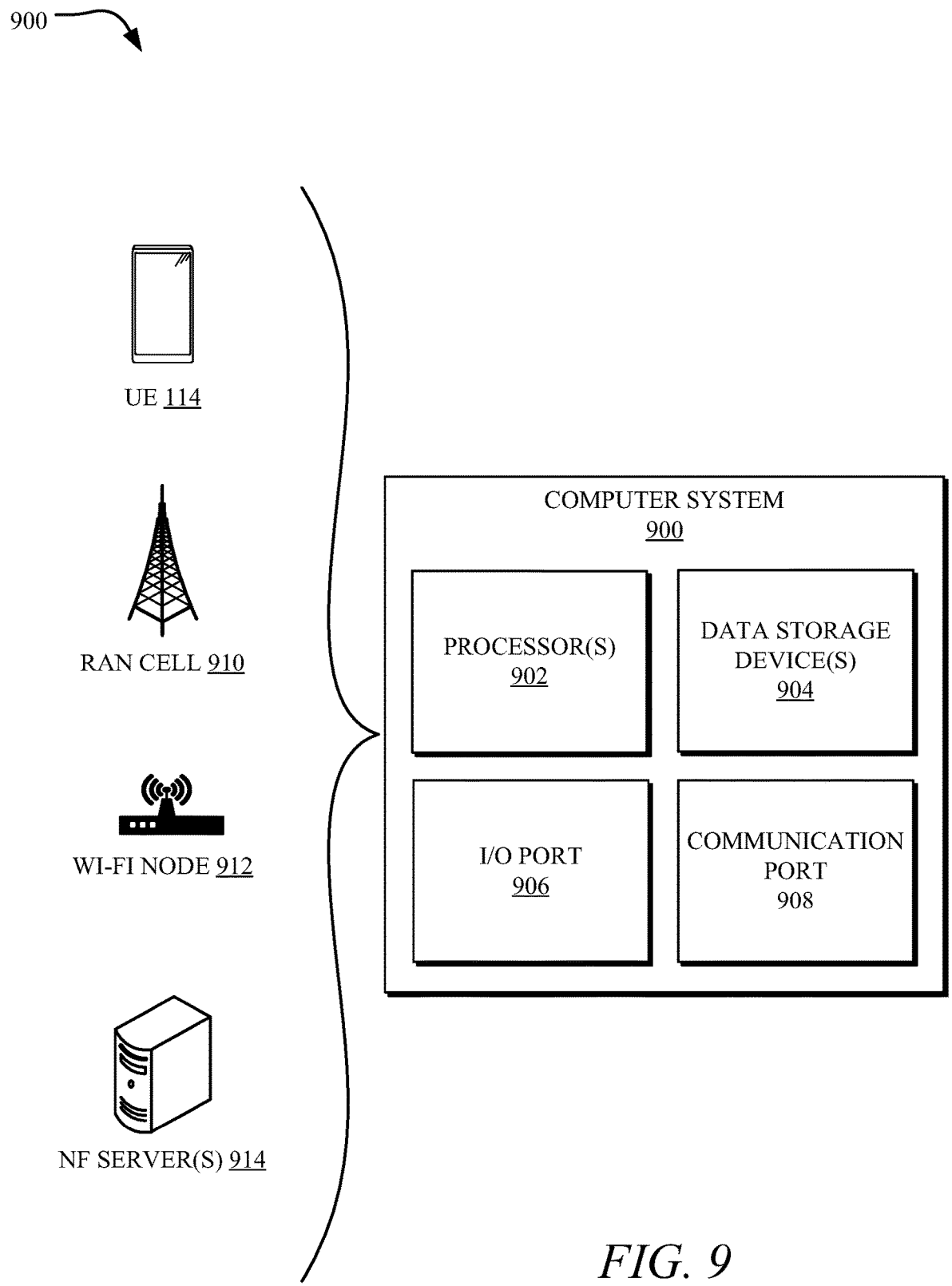
FIG. 9 illustrates an example computer system to implement the system of FIG. 1 and/or the system architectures of FIGS. 2-8 to converge an MNO core network with an H-MVNO core network.

FIG. 9 illustrates an example of one or more computer system(s) 900 which may form at least a portion of the system 100 and the system architectures 200-800 discussed herein. The computer system 900 depicted in FIG. 9 can represent the UE 114 and/or various hardware components of the MNO core 102 (e.g., the MNO SA network 202), the MSO core 104 (e.g., the H-MVNO SA network 204), the backhaul networks 216 and 220, and the like. It will be appreciated that specific implementations of these devices may have differing possible specific computing architectures not all of which are specifically discussed herein but will be understood by those of ordinary skill in the art.

The computer system(s) 900 may be capable of executing one or more computer program products to execute a computer process. Data and program files may be input to the computer system 900, which reads the files and executes the programs therein. The computer system(s) 900 can include one or more hardware processors 902, one or more data storage devices 904, one or more I/O ports 906, and/or one or more communication ports 908. Additionally, other elements that will be recognized by those skilled in the art may be included in the computer system 900. Various elements of the computer system 900 may communicate with one another by way of one or more communication buses, point-to-point communication paths, network interfaces, or other communication means. In some examples, the computer system 900 is the UE 114; a RAN cell 910 of the H-MVNO access network 214 or the MNO access network 218, a Wi-Fi node 912 of the H-MVNO access network 214, and/or one or more servers to implement the NFs (e.g., NF server(s) 914) forming the networks discussed herein, such as the MNO core 102 (e.g., the MNO core network 202), the MSO core 104 (e.g., the H-MVNO core network 204), the backhaul networks 216 and 220, and the like. The computer system(s) 900, such as the NF servers 914, can store, execute, host, or otherwise implement any of the NFs discussed herein.

In some instances, the computer system(s) 900 forming at least a portion of the UE 114 can be a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof, and the like.

The processor 902 includes, for example, a central processing unit (CPU), a microprocessor, a microcontroller, a digital signal processor (DSP), a Field Programmable Gate Array (FPGA) and/or one or more internal levels of cache. There can be one or more processors 902, such that the processor 902 comprises a single central-processing unit, or a plurality of processing units capable of executing instructions and performing operations in parallel with each other, referred to as a parallel processing environment.

The computer system 900 may be a stand-alone computer, a distributed computer, a cloud platform, a private cloud, a hybrid public/private cloud or any other type of computer, such as one or more external computers made available via a cloud computing architecture. The presently described technology is optionally implemented in software stored on the data storage device(s) 904 (e.g., the one or more memory device(s) 204), and/or communicated via one or more of the I/O port(s) 906 and/or communication port(s) 908, thereby transforming the computer system 900 in FIG. 9 to a special purpose machine for implementing the operations described herein. Examples of the computer system 900 include personal computers, terminals, microcontrollers, base stations, workstations, mobile phones, tablets, laptops, personal computers, multimedia consoles, gaming consoles, set top boxes, and the like.

The one or more data storage device(s) 904 may include any non-volatile data storage device capable of storing data generated or employed within the computer system 900, such as computer-executable instructions for performing a computer process, which may include instructions of both application programs and an operating system (OS) that manages the various components of the computer system 900. The data storage device(s) 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The data storage device(s) 904 may include volatile memory (e.g., dynamic random-access memory (DRAM), static random access memory (SRAM), etc.) and/or non-volatile memory (e.g., read-only memory (ROM), flash memory, etc.). The data storage device 904 may include a non-transitory machine-readable medium having stored thereon instructions, which may be used to program the computer system 900 (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Computer program products, NFs running as programs (e.g., on Kubernetes), a virtualized platform using hypervisor, etc., containing mechanisms to effectuate the systems and methods in accordance with the presently described technology may reside in the data storage device(s) 904, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures. The machine-readable media may store instructions that, when executed by the processor, cause the systems to perform the operations disclosed herein.

In some implementations, the computer system 900, depending on whether it is the UE or an NF server 914 of a virtualization or cloud platform, can include one or more ports, such as the one or more input/output (I/O) port(s) 906 and the one or more communication port(s) 908, for communicating with other computing devices or cloud/virtualized network functions. It will be appreciated that the I/O port(s) 906 and the communication port(s) 908 may be combined or separate and that more or fewer ports may be included in the computer system 900.

The I/O port(s) 906 may be connected to an I/O device, or other device, by which information is input to or output from the computer system 900. Such I/O devices may include, without limitation, one or more input devices, output devices, and/or environment transducer devices. In some instances, the input devices convert a human-generated signal, such as, human voice, physical movement, physical touch or pressure, and/or the like, into electrical signals as input data into the computer system 900 via the I/O port 906. Similarly, the output devices may convert electrical signals received from computer system 900 via the I/O port 906 (or generated by the computer system 900) into signals that may be sensed as output by a human, such as sound, light, and/or touch. The I/O port(s) 906 may be connected to an I/O device, or other device, by which information is input to or output from the computer system 900. Such I/O devices may include, without limitation, one or more input devices, output devices, and/or environment transducer devices. In some instances, the input devices convert a human-generated signal, such as, human voice, physical movement, physical touch or pressure, and/or the like, into electrical signals as input data into the computer system 900 via the I/O port 906. Similarly, the output devices may convert electrical signals received from computer system 900 via the I/O port 906 (or generated by the computer system 900) into signals that may be sensed as output by a human, such as sound, light, and/or touch. The input device of the UE 114 may be a touchscreen, microphone, camera, keypad, or other type of device to receive an input so the user of the UE 114 can interact with the system 100.

In some implementations, a communication port 908 is connected to a network by way of which the computer system 900 may receive network data useful in executing the methods and systems set out herein as well as transmitting information and network configuration changes determined thereby. For instance, the communication port 908 may use any of the 3GPP access layer protocols, interfaces, and messages discussed. Examples of such networks or connections include, without limitation, the one or more standards-based inter-network interfaces 106, Universal Serial Bus (USB), Ethernet, Wi-Fi, Bluetooth®, Near Field Communication (NFC) and so on. Further, the communication port 908 may communicate with an antenna or other link for electromagnetic signal transmission and/or reception.

In an example implementation, operations performed by the system 100 and the system architectures 200-800 discussed herein may be embodied by instructions stored on the data storage devices 904 and executed by the processor 902. Furthermore, methods disclosed herein may be implemented as sets of instructions or software readable by the processor 902. Further, it is understood that the specific order or hierarchy of steps in the methods disclosed are instances of example approaches. Any accompanying method claims present elements of the various steps in a sample order, and are not necessarily meant to be limited to the specific order or hierarchy presented (unless explicitly recited), for instance, when implemented as the sets of instructions or software executed by the computer system 900.

Figure 10:
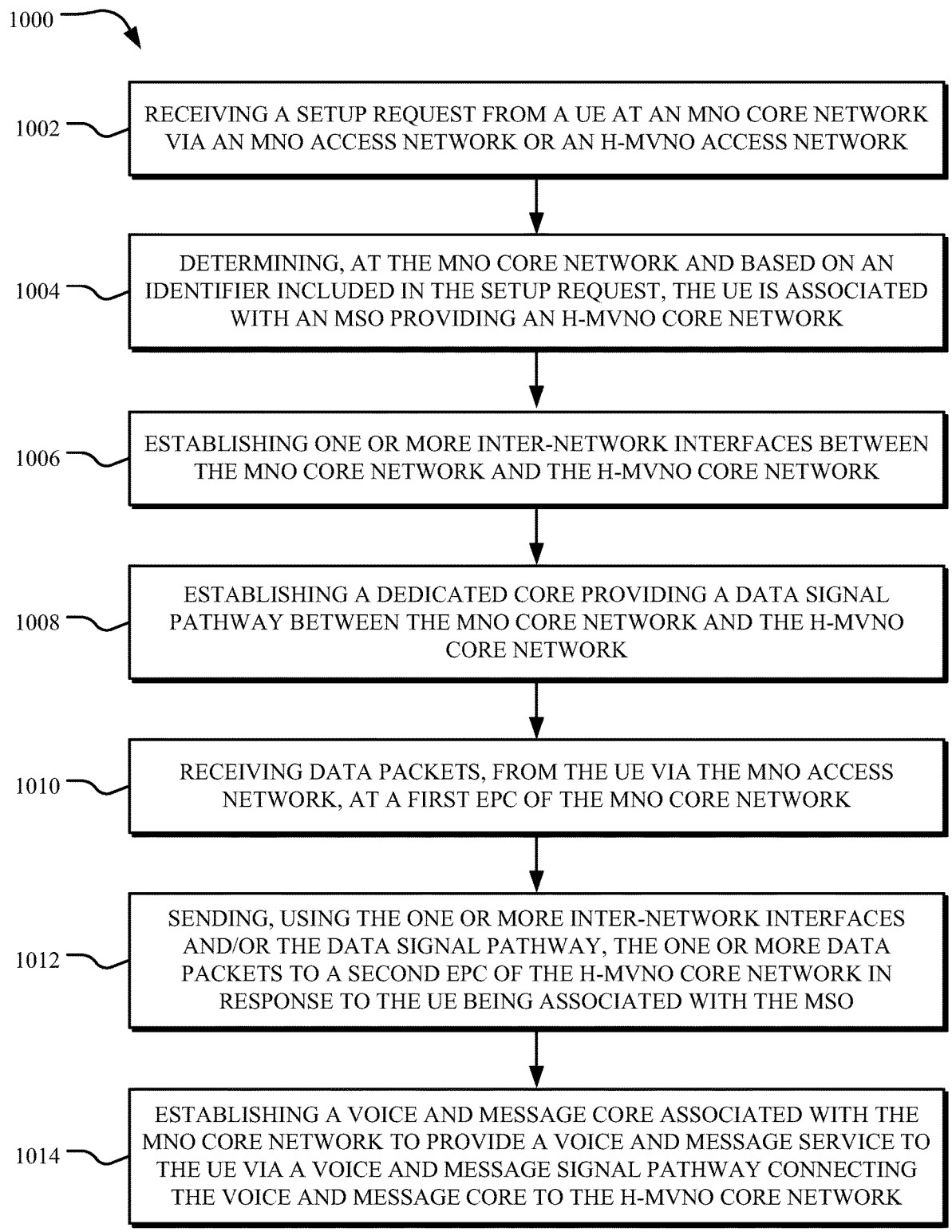
FIG. 10 illustrates an example method which can be performed by the system of FIG. 1 and/or the system architectures of FIGS. 2-8 to converge an MNO core network with an H-MVNO core network.

FIG. 10 illustrates an example method 1000 to connect the MNO core network 202 to the H-MVNO core network 204 using the one or more standards-based inter-network interfaces 106, which can be performed by at least the system 100.

At operation 1002, the method 1000 receives a setup request from a UE at an MNO core network via an MNO access network. At operation 1004, the method 1000 determines, at the MNO core network and based on an identifier included in the setup request, the UE is associated with an MSO providing an H-MVNO core network. At operation 1006, the method establishes one or more inter-network interfaces between the MNO core network and the H-MVNO core network. In some examples, the MNO access network authenticates and authorizes service to the UE. For instance, when the UE is in the MNO coverage area, the UE can be authenticated via the MNO SIM using the credentials provisioned in the MNO network (e.g., as depicted in FIGS. 2 and 3). In some dual-SIM scenarios (e.g., as depicted in FIG. 3), when the UE is in the MNO coverage area, the UE can be authenticated via both MNO and MSO SIM using the credentials provisioned in the MNO core network and the H-MVNO core network. The MNO core network can retrieve the information necessary to authenticate the MSO SIM by establishing the signaling pathway between the MNO core network and the H-MVNO core network. In some single SIM scenarios (e.g., as depicted in FIG. 5), the UE can be authenticated via MSO SIM using the credentials provisioned in the H-MVNO networks. The MNO network can retrieve the information necessary to authenticate the MSO SIM by establishing the signaling pathway between the MNO and H-MVNO core networks. At operation 1008, the method 1000 establishes a dedicated core providing a data and signaling pathway between the MNO core network and the H-MVNO core network. Operation 1008 can include establishing a data and signaling pathway between the MNO core network and H-MVNO core network (e.g., as depicted in FIGS. 2 and 3). At operation 1010, the method 1000 receives data packets, from the UE via the MNO access network, at the MNO core network or from an internal/external application at the H-MVNO core network. At operation 1012, the method 1000 sends, using the one or more inter-network interfaces and/or the data and signaling pathway, the one or more data packets to the H-MVNO core network (if received from the UE) or to the UE (if received from an internal/external application) in response to the UE being associated with the MSO. At operation 1014, the method 1000 establishes a voice and message core associated with the MNO core network to provide a voice and message service to the UE via a voice and message signal and signaling pathway connecting the voice and message core to the H-MVNO core network.

It is to be understood that the specific order or hierarchy of steps in the methods depicted in FIG. 10 are instances of example approaches and can be rearranged while remaining within the disclosed subject matter. For instance, any of the steps depicted in FIG. 10 may be omitted, repeated, performed in parallel, performed in a different order, and/or combined with any other of the steps depicted in FIG. 10.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method to manage traffic for a mobile virtual network operator (MVNO), the method comprising:
   receiving, at a mobile network operator (MNO) core network, a setup request from a user equipment (UE) via at least one of an MNO access network or a hybrid (H)-MVNO access network;
   determining, at the MNO core network and based on an identifier included in the setup request, the UE is associated with a multiple-system operator (MSO) providing an H-MVNO core network;
   establishing one or more inter-network interfaces between the MNO core network and the H-MVNO core network;
   receiving one or more data packets, from the UE, at the MNO core network; and
   sending, using the one or more inter-network interfaces, the one or more data packets to the H-MVNO core network in response to the UE being associated with the MSO.

2. The method of claim 1, wherein the UE is a single Subscriber Identity Module (SIM) UE with an H-MVNO SIM.

3. The method of claim 1, further comprising:
   establishing a voice and message core associated with the MNO core network to provide a voice and message service to the UE via a voice and message signal pathway connecting the voice and message core to the H-MVNO core network.

4. The method of claim 1, further comprising:
   establishing a dedicated core associated with the MNO core network, the dedicated core including a dedicated mobility management entity (MME) to provide a data service signal pathway connecting the MNO access network to the H-MVNO core network.

5. The method of claim 1, wherein the one or more inter-network interfaces include an S8 interface established by a mobility management entity (MME) of the MNO core network to connect the MNO core network to the H-MVNO core network.

6. The method of claim 5, wherein the one or more inter-network interfaces include an S6a interface established by the MME of the MNO core network to connect the MNO core network to the H-MVNO core network.

7. The method of claim 1, wherein the identifier is an access point name (APN) value corresponding to a user associated with the UE.

8. The method of claim 7, wherein determining the UE is associated with the MSO includes receiving, at a mobility management entity (MME) of the MNO network and from a Home Subscriptions Service (HSS) of the H-MVNO core network, a subscription profile associated with the UE that includes the APN value.

9. The method of claim 8, further comprising:
   sending the APN value from the MNO core network to a packet data gateway of the H-MVNO core network to establish a protocol data unit (PDU) session for the UE.

10. The method of claim 1, wherein the H-MVNO access network includes one or more fifth generation (5G) small cell access nodes.

11. The method of claim 1, wherein the H-MVNO access network includes one or more Wi-Fi routers.

12. The method of claim 1, wherein the UE is a dual subscriber identity module (SIM) UE with an H-MVNO SIM and an MNO SIM.

13. The method of claim 12, wherein:
   the one or more data packets are sent to the H-MVNO core network via a data signal pathway provided by the one or more inter-network interfaces based on the H-MVNO SIM; and
   the MNO core network includes a voice signal pathway to provide a voice service based on the MNO SIM.

14. The method of claim 1, wherein:
   the MNO access network is a 4G network or a 5G network; and
   the H-MVNO access network is a Wi-Fi network.

15. The method of claim 1, wherein:
   the one or more inter-network interfaces include an S6a interface; and
   the method further includes performing access traffic steering switching, and switch (ATSSS) between the MNO access network and the H-MVNO access network using the S6a interface.

16. The method of claim 1, wherein:
   the one or more inter-network interfaces are a first inter-network interface;
   the identifier is a subscriber identity module (SIM) identifier for a SIM at the UE; and
   the method further includes:
      determining, at the MNO core network, the SIM identifier is associated with the MSO providing the H-MVNO core network; and
      establishing a second inter-network interface between the MNO core network and a home subscriber service (HSS) or a policy and charging rules function (PCRF) of the H-MVNO core network to authenticate the SIM identifier.

17. A method to manage traffic for a mobile virtual network operator (MVNO), the method comprising:
   receiving, at a mobile network operator (MNO) core network, a setup request from a single-subscriber identity module (SIM) user equipment (UE) via an MNO access network;
   determining, at the MNO core network and based on an identifier included in the setup request, the single-SIM UE is associated with a multiple-system operator (MSO) providing an H-MVNO core network;
   establishing a dedicated core associated with the MNO core network to provide a data signal pathway between the MNO core network and the H-MVNO core network;

receiving one or more data packets, from the UE via the MNO access network, at the MNO core network; and sending, using the data signal pathway provided by the dedicated core, the one or more data packets to the H-MVNO core network in response to the single-SIM UE being associated with the MSO.

18. The method of claim 17, wherein establishing the dedicated core includes designating an EPC as a shared EPC to establish a plurality of inter-network interfaces with a plurality of EPCs associated with a plurality of MSOs.

19. The method of claim 18, wherein the plurality of inter-network interfaces includes a plurality of S10 interfaces and a plurality of N26 interfaces.

20. A method to manage traffic for a mobile virtual network operator (MVNO), the method comprising:

receiving, at a mobile network operator (MNO) core network, a setup request from a single-subscriber identity module (SIM) user equipment (UE);

determining, at the MNO core network and based on an identifier included in the setup request, the UE is associated with a multiple-system operator (MSO) providing an H-MVNO core network;

establishing one or more of an inter-network interface or a dedicated core associated with the MNO core network that provides a data pathway between the MNO core network and the H-MVNO core network;

sending, using the inter-network interface or the data pathway provided by the dedicated core, one or more data packets originating from the UE to the H-MVNO core network in response to the UE being associated with the MSO; and establishing a voice and message core associated with the MNO core network to provide a voice and message service to the single-SIM UE via a voice and message signal pathway connecting the voice and message core to the H-MVNO core network.

* * * * *